US012659940B2

(12) United States Patent
Gou et al.

(10) Patent No.: US 12,659,940 B2
(45) Date of Patent: Jun. 16, 2026

(54) METHODS AND DEVICES FOR TIME-FREQUENCY RESOURCE CONFIGURATION

(71) Applicant: ZTE CORPORATION, Shenzhen (CN)

(72) Inventors: Wei Gou, Shenzhen (CN); Xianghui Han, Shenzhen (CN); Xingguang Wei, Shenzhen (CN); Kai Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 302 days.

(21) Appl. No.: 18/534,226

(22) Filed: Dec. 8, 2023

(65) Prior Publication Data

US 2024/0107512 A1     Mar. 28, 2024

Related U.S. Application Data

(63) Continuation of application No. PCT/CN2022/079688, filed on Mar. 8, 2022.

(51) Int. Cl.
*H04W 72/0457* (2023.01)
*H04L 5/00* (2006.01)
(Continued)

(52) U.S. Cl.
CPC ... *H04W 72/0457* (2023.01); *H04W 72/0453* (2013.01); *H04W 72/1263* (2013.01); *H04L 5/0007* (2013.01)

(58) Field of Classification Search
CPC ......... H04W 72/0457; H04W 72/0453; H04W 72/1263; H04W 72/1268; H04W 72/541;

H04W 72/044; H04W 72/0446; H04W 72/23; H04L 5/0007; H04L 5/0044; H04L 5/0053
See application file for complete search history.

(56) References Cited

U.S. PATENT DOCUMENTS

2019/0349154 A1    11/2019    Tsai et al.
2020/0154446 A1    5/2020    Yerramalli et al.
(Continued)

FOREIGN PATENT DOCUMENTS

WO    WO-2020/144402 A1    7/2020
WO    WO-2020/196804 A1    10/2020
(Continued)

OTHER PUBLICATIONS

Examination Report No. 3 for AU Appl. No. 2022445129, dated Mar. 24, 2025 (4 pages).
(Continued)

*Primary Examiner* — Eric Myers
(74) *Attorney, Agent, or Firm* — Foley & Lardner LLP

(57) ABSTRACT

System, methods and apparatuses for time-frequency resource configuration can include a wireless communication node configuring a first bandwidth part (BWP) in frequency domain. The wireless communication node can configure at least a first subband BWP within the first BWP, and at least one specific type of symbols for the first subband BWP. Configuring the first BWP and the first subband BWP can include the wireless communication node signaling the configurations of the first BWP and the first subband BWP to a wireless communication device.

20 Claims, 8 Drawing Sheets

(51) Int. Cl.
   _H04W 72/0453_       (2023.01)
   _H04W 72/1263_       (2023.01)

(56)                     References Cited

U.S. PATENT DOCUMENTS

| | | |
|---|---|---|
| 2020/0228282 A1 | 7/2020 | Kwak et al. |
| 2021/0127450 A1 | 4/2021 | Abdoli et al. |
| 2021/0400719 A1 | 12/2021 | Oh et al. |
| 2022/0007395 A1 | 1/2022 | Lei et al. |
| 2022/0312469 A1 | 9/2022 | Choi et al. |

FOREIGN PATENT DOCUMENTS

| | | |
|---|---|---|
| WO | WO-2021/071260 A1 | 4/2021 |
| WO | WO-2022/006342 A1 | 1/2022 |
| WO | WO-2022/021223 A1 | 2/2022 |
| WO | WO-2022/031824 A1 | 2/2022 |

OTHER PUBLICATIONS

Huawei et al., "NRU wideband BWP operation", 3GPP TSG RAN WG1 Meeting #96bis, R1-1903932, Apr. 12, 2019, Xi'an, China (9 pages).

International Search Report and Written Opinion for PCT Appl. No. PCT/CN2022/079688, mailed on Nov. 25, 2022 (7 pages).

Examination Report No. 2 for AU Appl. No. 2022445129, dated Jan. 16, 2025 (5 pages).

Extended European Search Report for EP Appl. No. 22930234.4, dated Mar. 14, 2025 (9 pages).

300

302

Configure a first bandwidth part (BWP) in frequency domain

304

Configure at least a first subband BWP within the first BWP, and at least one specific type of symbols for the first subband BWP

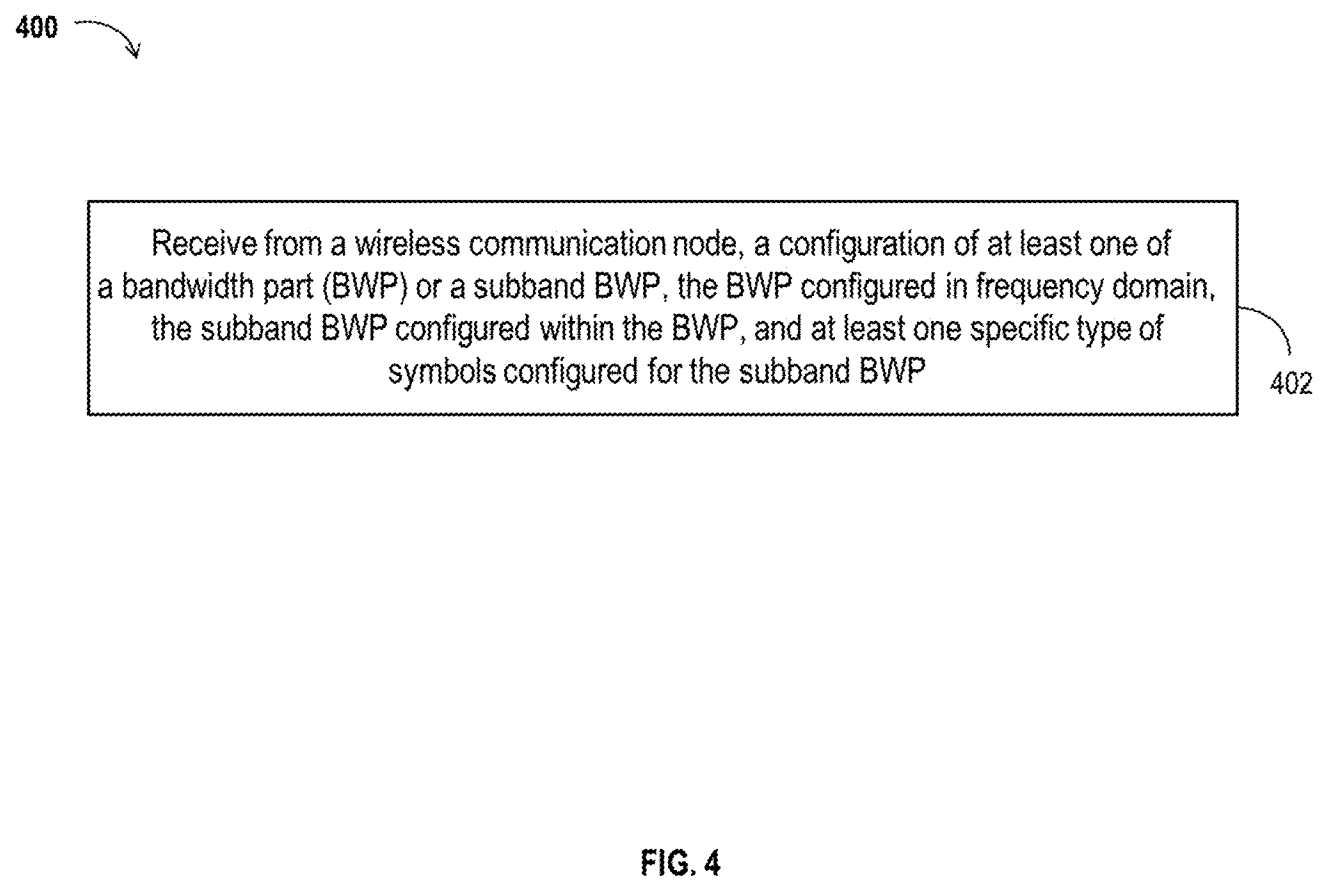

400

402

Receive from a wireless communication node, a configuration of at least one of a bandwidth part (BWP) or a subband BWP, the BWP configured in frequency domain, the subband BWP configured within the BWP, and at least one specific type of symbols configured for the subband BWP

FIG. 4

METHODS AND DEVICES FOR TIME-FREQUENCY RESOURCE CONFIGURATION

CROSS-REFERENCE TO RELATED APPLICATION

This application claims the benefit of priority under 35 U.S.C. § 120 as a continuation of International Patent Application No. PCT/CN2022/079688, filed on Mar. 8, 2022, the disclosure of which is incorporated herein by reference in its entirety.

TECHNICAL FIELD

The disclosure relates generally to wireless communications, including but not limited to systems and methods for time-frequency resource configuration.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems associated with data transmission in wireless communication systems, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication node can configure a first bandwidth part (BWP) in frequency domain. The wireless communication node can configure at least a first subband BWP within the first BWP, and at least one specific type of symbols or at least one specific symbol for the first subband BWP.

The at least one specific type of symbols or the at least one specific symbol can include at least one of a symbol for a transmission direction that is opposite to that of the first subband BWP, a symbol with a flexible transmission direction, or a symbol for a transmission direction that is same as that of the first subband BWP. The wireless communication node can send, to a wireless communication device via a signaling, a configuration of at least one of the first BWP or the at least one first subband BWP. The configuration of the first BWP can include a configuration of orthogonal frequency division multiplexing (OFDM) symbols for the first BWP in time domain. The wireless communication node can configure, by the wireless communication node, the first subband BWP for a first transmission direction, and a second subband BWP for a second transmission direction, within the first BWP.

When the at least one specific type of symbols or the at least one specific symbol includes a symbol with a flexible transmission direction and the first subband BWP is for uplink transmission direction, the wireless communication node can configure the first subband BWP to not overlap in the frequency domain with a downlink signal or channel that is common to one or more wireless communication devices.

When the at least one specific type of symbols or the at least one specific symbol includes a symbol with a flexible transmission direction and the first subband BWP is for uplink transmission direction, the wireless communication node can configure the first subband BWP to overlap in the frequency domain with a downlink signal or channel that is common to one or more wireless communication devices. The downlink signal or channel is not to be received by the wireless communication device in the symbol with the flexible transmission direction.

When the at least one specific type of symbols or the at least one specific symbol includes a symbol with a flexible transmission direction and the first subband BWP is for uplink transmission direction, the wireless communication node can configure the first subband BWP to overlap in the frequency domain with a downlink signal or channel that is common to one or more wireless communication devices. The downlink signal or channel may be received by the wireless communication device in the symbol with the flexible transmission direction, within which the wireless communication device may not be scheduled to transmit uplink data.

When the at least one specific type of symbols or the at least one specific symbol includes a symbol with a flexible transmission direction and the first subband BWP is for uplink transmission direction, the wireless communication node can configure the first subband BWP to overlap in the frequency domain with a downlink signal or channel that is common to one or more wireless communication devices. The first subband BWP can exclude symbols in the time domain where the downlink signal or channel is located.

When the at least one specific type of symbols or the at least one specific symbol includes a symbol with a flexible transmission direction and the first subband BWP is for uplink transmission direction, the wireless communication node can configure the first subband BWP to overlap in the frequency domain with a downlink signal or channel that is common to one or more wireless communication devices. If the wireless communication device is scheduled to perform uplink transmission on a resource that overlaps in the time domain with that of the downlink signal or channel, the wireless communication device can skip the uplink transmission on the resource that overlaps in the time domain with that of the downlink signal or channel.

When the at least one specific type of symbols or the at least one specific symbol includes a symbol with a flexible transmission direction and the first subband BWP is for downlink transmission direction, the wireless communication node can configure the first subband BWP to not overlap in the frequency domain with an uplink signal or channel that is common to one or more wireless communication devices.

When the at least one specific type of symbols or the at least one specific symbol includes a symbol with a flexible transmission direction and the first subband BWP is for downlink transmission direction, the wireless communication node can configure the first subband BWP to overlap in the frequency domain with an uplink signal or channel that is common to one or more wireless communication devices. The uplink signal or channel may not be transmitted by the wireless communication device in the symbol with the flexible transmission direction.

When the at least one specific type of symbols or the at least one specific symbol includes a symbol with a flexible transmission direction and the first subband BWP is for downlink transmission direction, the wireless communication node can configure the first subband BWP to overlap in the frequency domain with an uplink signal or channel that is common to one or more wireless communication devices. The uplink signal or channel may be transmitted by the wireless communication device in the symbol with the flexible transmission direction, within which the wireless communication device is not scheduled to receive downlink data.

When the at least one specific type of symbols or the at least one specific symbol includes a symbol with a flexible transmission direction and the first subband BWP is for downlink transmission direction, the wireless communication node can configure the first subband BWP to overlap in the frequency domain with an uplink signal or channel that is common to one or more wireless communication devices. The first subband BWP can exclude symbols in the time domain where the uplink signal or channel is located.

When the at least one specific type of symbols or the at least one specific symbol includes a symbol with a flexible transmission direction and the first subband BWP is for downlink transmission direction, the wireless communication node can configure the first subband BWP to overlap in the frequency domain with an uplink signal or channel that is common to one or more wireless communication devices. If the wireless communication device is scheduled to perform downlink reception on a resource that overlaps in the time domain with that of the uplink signal or channel, the wireless communication device can skip the downlink reception on the resource that overlaps in the time domain with that of the uplink signal or channel.

When the at least one specific type of symbols or the at least one specific symbol includes a symbol with a downlink transmission direction and the first subband BWP is for uplink transmission direction, the wireless communication node can configure the first subband BWP to not overlap in the frequency domain with a downlink signal or channel that is common to one or more wireless communication devices.

When the at least one specific type of symbols or the at least one specific symbol includes a symbol with a downlink transmission direction and the first subband BWP is for uplink transmission direction, the wireless communication node can configure the first subband BWP to overlap in the frequency domain with a downlink signal or channel that is common to one or more wireless communication devices. The downlink signal or channel may not be received by the wireless communication device in the symbol with the downlink transmission direction.

When the at least one specific type of symbols or the at least one specific symbol includes a symbol with a downlink transmission direction and the first subband BWP is for uplink transmission direction, the wireless communication node can configure the first subband BWP to overlap in the frequency domain with a downlink signal or channel that is common to one or more wireless communication devices. The downlink signal or channel may be received by the wireless communication device in the symbol with the downlink transmission direction, within which the wireless communication device is not scheduled to transmit uplink data.

When the at least one specific type of symbols or the at least one specific symbol includes a symbol with a downlink transmission direction and the first subband BWP is for uplink transmission direction, the wireless communication node can configure the first subband BWP to overlap in the frequency domain with a downlink signal or channel that is common to one or more wireless communication devices. The first subband BWP can exclude symbols in the time domain where the downlink signal or channel is located.

When the at least one specific type of symbols or the at least one specific symbol includes a symbol with a downlink transmission direction and the first subband BWP is for uplink transmission direction, the wireless communication node can configure the first subband BWP to overlap in the frequency domain with a downlink signal or channel that is common to one or more wireless communication devices. If the wireless communication device is scheduled to perform uplink transmission on a resource that overlaps in the time domain with that of the downlink signal or channel, the wireless communication device can skip the uplink transmission on the resource that overlaps in the time domain with that of the downlink signal or channel.

When the at least one specific type of symbols or the at least one specific symbol includes a symbol with an uplink transmission direction and the first subband BWP is for downlink transmission direction, the wireless communication node can configure the first subband BWP to not overlap in the frequency domain with an uplink signal or channel that is common to one or more wireless communication devices.

When the at least one specific type of symbols or the at least one specific symbol includes a symbol with an uplink transmission direction and the first subband BWP is for downlink transmission direction, the wireless communication node can configure the first subband BWP to overlap in the frequency domain with an uplink signal or channel that is common to one or more wireless communication devices. The uplink signal or channel may not be transmitted by the wireless communication device in the symbol with the uplink transmission direction.

When the at least one specific type of symbols or the at least one specific symbol includes a symbol with an uplink transmission direction and the first subband BWP is for downlink transmission direction, the wireless communication node can configure the first subband BWP to overlap in the frequency domain with an uplink signal or channel that is common to one or more wireless communication devices. The uplink signal or channel may be transmitted by the wireless communication device in the symbol with the uplink transmission direction, within which the wireless communication device is not scheduled to receive downlink data.

When the at least one specific type of symbols or the at least one specific symbol includes a symbol with an uplink transmission direction and the first subband BWP is for downlink transmission direction, the wireless communication node can configure the first subband BWP to overlap in the frequency domain with an uplink signal or channel that is common to one or more wireless communication devices. The first subband BWP can exclude symbols in the time domain where the uplink signal or channel is located.

When the at least one specific type of symbols or the at least one specific symbol includes a symbol with an uplink transmission direction and the first subband BWP is for downlink transmission direction, the wireless communication node can configure the first subband BWP to overlap in the frequency domain with an uplink signal or channel that is common to one or more wireless communication devices. If the wireless communication device is scheduled to perform downlink reception on a resource that overlaps in the time domain with that of the uplink signal or channel, the wireless communication device can skip the downlink reception on the resource that overlaps in the time domain with that of the uplink signal or channel.

At least one aspect is directed to a system, method, apparatus, or a computer-readable medium. A wireless communication device may receive, from a wireless communication node, a configuration of at least one of a first bandwidth part (BWP) or a first subband BWP. The first BWP can be configured in frequency domain, within which at least a first subband BWP is configured, and at least one specific type of symbols or at least one specific symbol is configured for the first subband BWP.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 is a flowchart illustrating a method of time-frequency resource configuration performed by a wireless communication device, according to example embodiments of the current disclosure;

DETAILED DESCRIPTION

Figure 1:
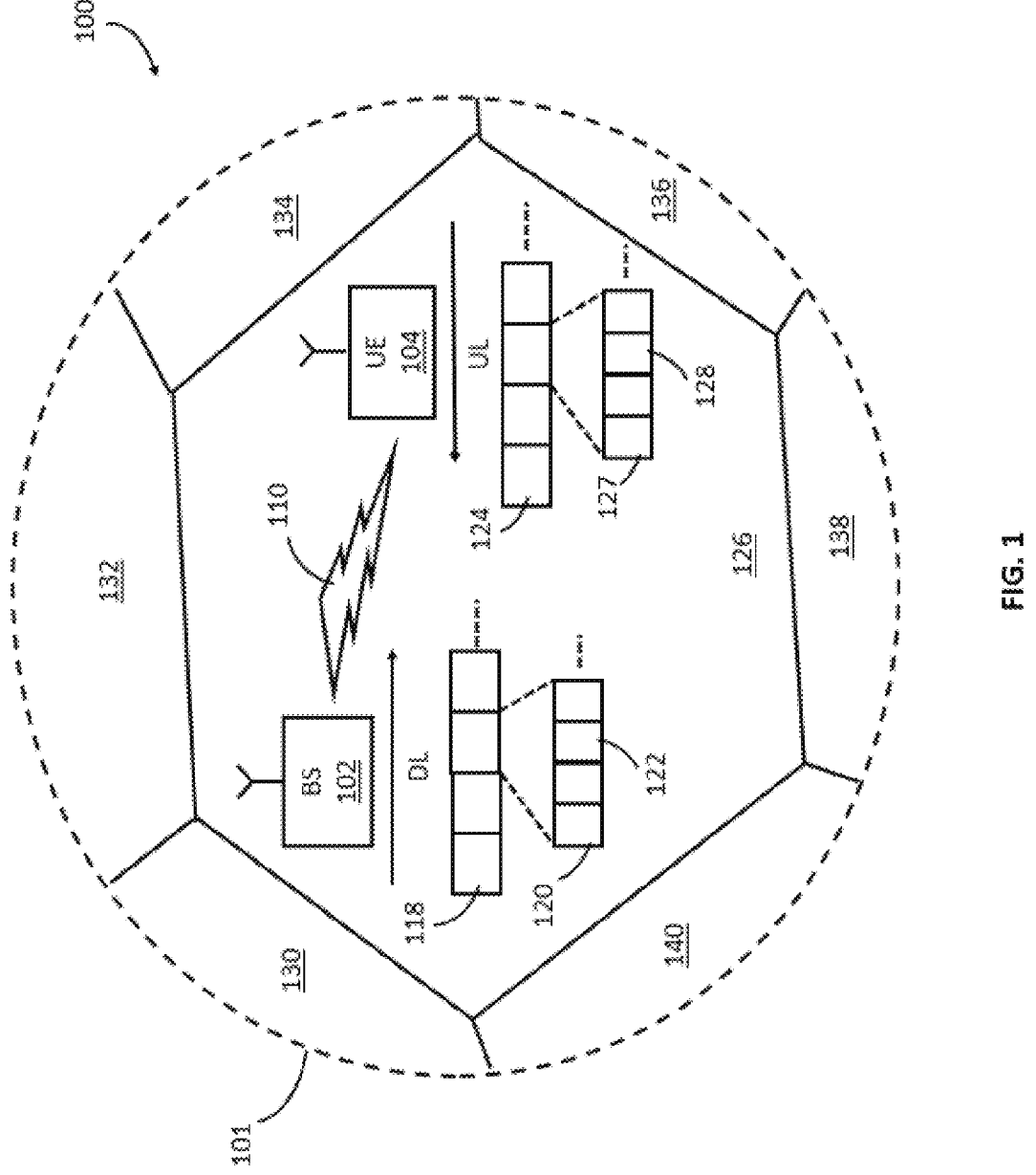
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In wireless communication systems, such as systems 100 and 200, time division duplex (TDD) spectrum resources are typically divided into downlink and uplink in the time domain in order to transmit uplink data and downlink data. For a TDD system, only uplink or downlink can be performed in each time period. One way to further improve the efficiency of TDD systems is to have such systems support full duplex communications. The purpose is to enable the TDD systems to support both uplink and downlink in each period. However, the full duplex technology may lead to increased cost, especially for user equipments (UEs). One approach to avoid the increased cost is to have the base station side support full duplex and the UE side support half duplex. That is, the wireless communication node 102 or 202 can support both uplink and downlink, while the wireless communication device 104 or 204 cannot support simultaneous uplink and downlink. This approach leads to maintaining a low UE cost and low complexity. This compromise solution can also improve the efficiency of the TDD systems.

A UE, such as wireless communication device 104 or 204, can be configured with uplink (UL) bandwidth part (BWP) and downlink (DL) BWP for transmission and reception. In such a case, the UE performs BWP handover between UL BWP and DL BWP to switch between uplink transmission and downlink reception. Also, the UE switches from DL BWP to UL BWP. If the frequency domain centers of UL BWP and DL BWP are not aligned, the UE will need more time to complete the BWP switching. If the center frequency points of the UL BWP and the DL BWP are aligned, the time to complete the BWP handover can be very small or even to zero. Therefore, reducing BWP switching time calls for alignment of the center frequency points of the UL BWP and the DL BWP. However, overlap of the UL BWP and the DL BWP can lead to significant increase signal interference.

Systems and methods described in the disclosure solve the above discussed problems related to supporting full-duplex or half-duplex technology. Specifically, new time-frequency resource and frame structure configurations described herein help reduce the BWP switching time, mitigate interference between the uplink and the downlink, and also improve the efficiency of resource usage as much as possible.

According to systems and methods described herein, a base station can configure a BWP, and configure at least one subband within the BWP. The base station can specify at least one type of symbols of the BWP within which each subband resides. The configured BWP provides a range in the frequency domain, and the base station can configure a subband BWP, referred to herein as subband UL BWP, for uplink transmission and another subband BWP, referred to herein as subband DL BWP, for downlink reception within the frequency domain range corresponding to the BWP. The center frequency points of the two subband BWPs may not be aligned. However, when performing uplink transmission and downlink reception, the UE uses (or takes into account) the center frequency point of the configured BWP, not the center frequencies of the two subband BWPs, for the purpose of data reception and data transmission.

In other words, while the UE uses the subband DL BWP and the subband UL BWP configured within the BWP for data reception and data transmission, respectively, the center frequency point during both the data reception and data transmission is considered to be the center frequency point of the BWP (but not the center frequency points of the subbands). As such, BWP switching time is significantly reduced or avoided. It is to be noted that the subband BWPs configured in the frequency domain range of the BWP may or may not overlap in the frequency domain.

In the following, section 1 describes example wireless communication systems that can implement novel and inventive time-frequency resource configuration. Section 2 describes various embodiments for configuring and implementing the time-frequency resource configuration.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node 102 or network node 102) and a user equipment device 104 (hereinafter "UE 104"; also referred to as wireless communication device 104) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include symbols 122/128. The symbols 122/128 may include data symbols or control symbols. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
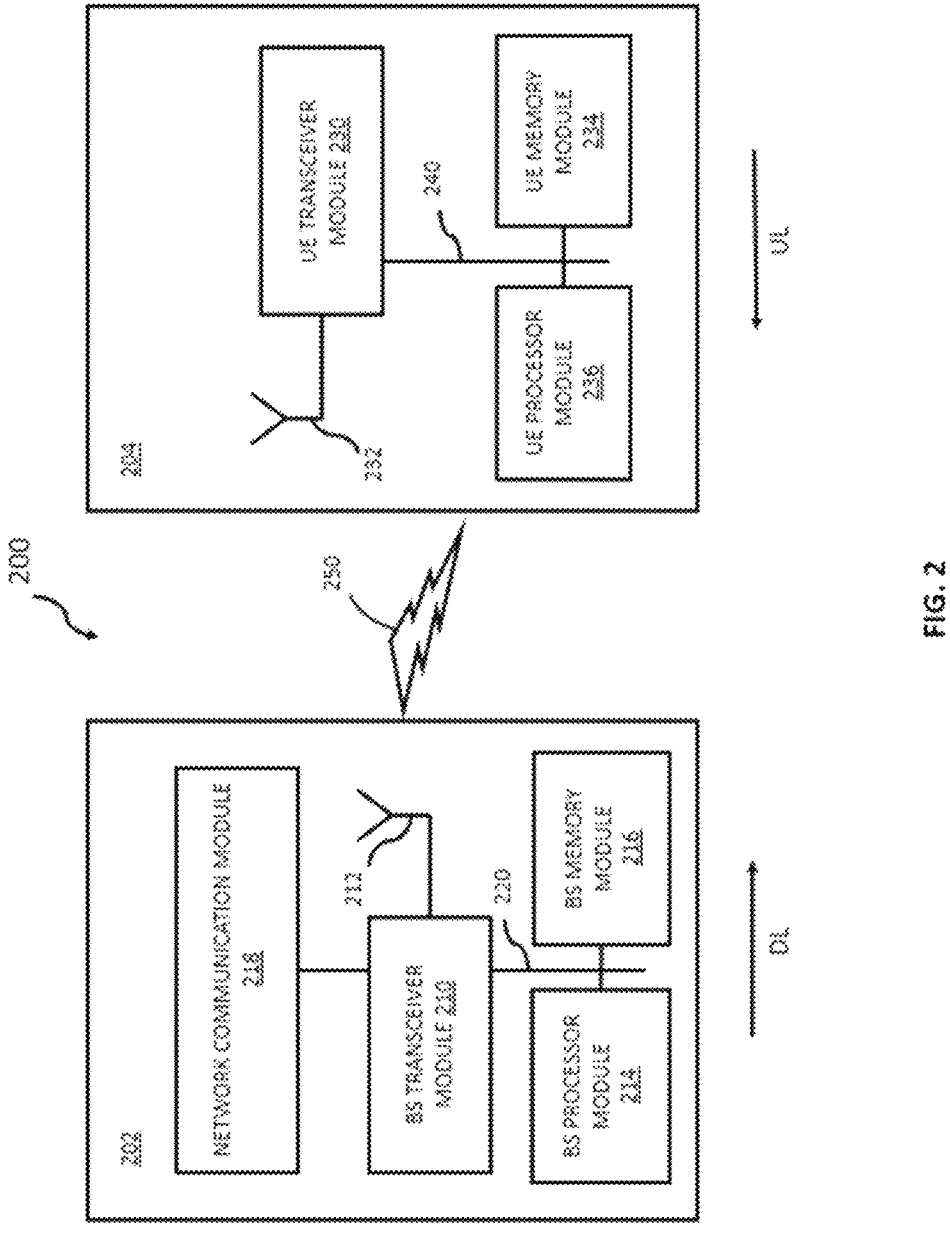
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 is also referred to herein as wireless communication node 202 or network node 202, and the UE 204 is also referred to herein as wireless communication device 204. The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232.

In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station trans-ceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Time-Frequency Resource Configuration

Figure 3:
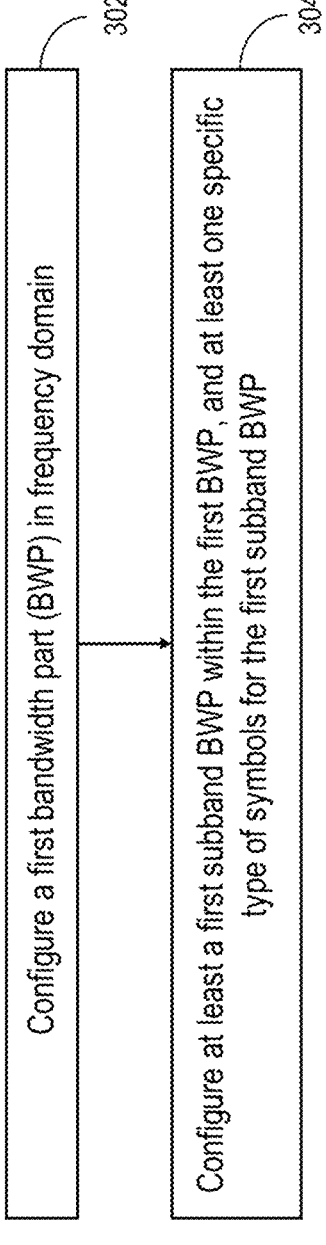
FIG. 3 is a flowchart illustrating a method of time-frequency resource configuration performed by a wireless communication node, in accordance with some embodiments of the present disclosure.

Referring to FIG. 3, a flowchart illustrating a method 300 of flexible subband configuration is shown, in accordance with some embodiments of the present disclosure. The method 300 can be performed or executed by a network node, such as the wireless communication node 102 or 202. In brief overview, the method 300 can include the wireless communication node 102 or 202 configuring a bandwidth part (BWP) in frequency domain (STEP 302), and configuring at least a subband BWP within the BWP, and at least one specific type of symbols or at least one specific symbol for the subband BWP (STEP 304).

FIG. 4 is a flowchart illustrating a method 400 of flexible subband configuration from the perspective of a wireless communication device 104 or 204, according to example embodiments of the current disclosure. Specifically, the method 400 can include the wireless communication device 104 or 204 receiving, from the wireless communication node 102 or 202, a configuration of at least one of a bandwidth part (BWP) or a subband BWP. The BWP can be configured in frequency domain, the subband BWP can be configured within the BWP, and at least one specific type of symbols or at least one specific symbol can be configured for the subband BWP. Note that, as used herein, the at least one specific type of symbols or at least one specific symbol can include a combination of the specific type(s) of symbols and the specific symbol(s).

In some implementations, the wireless communication node 102 or 202 can configure the BWP, configure one or more subband BWPs within the BWP, and send indication(s) of the configuration of the BWP and the subband BWP(s) to the wireless communication device 104 or 104. In other words, the configuration received by the wireless communication device 104 or 204 according to FIG. 4 can be the same configuration performed by the wireless communication node 102 or 202 according to FIG. 3. The methods 300 and 400 described in FIGS. 3 and 4, respectively, can be performed according to any combination of the embodiments and/or implementations described below.

Referring back to FIG. 3, the method 300 can include the wireless communication node 102 or 202 configuring a bandwidth part (BWP) in frequency domain (STEP 302). Configuring the BWP can include determining or specifying a frequency range and a time duration of the BWP. In some implementations, the wireless communication node 102 or 202 can determine or specify the frequency range of the BWP in terms of subcarriers, and determine or specify the time duration of the BWP in terms of symbols, such as orthogonal frequency division multiplexing (OFDM) symbols. In some implementations, the wireless communication node 102 or 202 can configure the BWP as a number of consecutive resource blocks (RBs). By configuring the BWP, the wireless communication node 102 or 202 can enable the wireless communication device 104 or 204 UEs to operate in narrow bandwidth. For instance, the frequency range of the BWP can be smaller than the frequency range of the symbols (e.g., OFDM symbols) or RBs. The wireless communication node 102 or 202 can configure another BWP with a wider bandwidth if the wireless communication device 104 or 204 demands more bandwidth.

The method 300 can include the wireless communication node 102 or 202 configuring (i) at least a subband BWP within the BWP and (ii) at least one specific type of symbols or at least one specific symbol for the subband BWP (STEP 304). Configuring the subband BWP can include the wireless communication node 102 or 202 determining or specifying a frequency range and a time duration of the subband BWP, such that the frequency range of the subband BWP is within the frequency range of the BWP and the time duration of the subband BWP is within the time duration of the BWP. The wireless communication node 102 or 202 can determine or specify the time duration of the subband BWP by configuring the at least one specific type of symbols and/or the at least one specific symbol for the subband BWP.

Configuring the at least one specific type of symbols for the subband BWP can include the wireless communication node 102 or 202 specifying or determining the type(s) of symbols in the BWP within which the subband BWP will reside. For instance, if the wireless communication node 102 or 202 configures the at least one specific type of symbols for the subband BWP to be a first symbol type and a second symbol type, the subband BWP will be configured to span, in the time domain, across all or part of symbols of the BWP having a type equal to the first type or the second type. By specifying the at least one specific type of symbols for the subband BWP, the wireless communication node 102 or 202 identifies the type(s) (e.g., DL, UL and/or flexible) of symbols in the BWP which will host the subband BWP. The wireless communication node 102 or 202 can configure at least one specific symbol for the first subband BWP. Configuring the at least one specific symbol can include specifying a set of symbols, e.g., via symbol indices or other symbol properties (e.g., other than symbol type), that will host the first subband BWP or a part thereof. For example, the wireless communication node 102 or 202 can configure symbols with indices 0 to 6 in a slot to host the first subband BWP. In some implementations, the wireless communication node 102 or 202 can configure a combination of at least one specific symbol and at least one specific symbol for the subband BWP.

In some implementations, the wireless communication node 102 or 202 can configure multiple subband BWPs in the BWP. In such implementations, the wireless communication node 102 or 202 can configure or specify, for each subband BWP, one or more corresponding type(s) of symbols and/or at least one specific symbol within the BWP that will host the subband BWP.

In some implementations, the wireless communication node 102 or 202 can send to the wireless communication device 104 or 204 via a signaling, a configuration of at least one of the BWP and/or the at least one subband BWP. The configuration of the BWP can include a configuration of OFDM symbols for the BWP in time domain. For instance, the wireless communication device 104 or 204 can determine or specify the types of OFDM symbols in the BWP and the locations of OFDM symbols of each type in the BWP. The signaling can include a new radio resource control (RRC) signaling, medium access control (MAC) control element (CE) or downlink control information (DCI) signaling that is introduced to configure some specific F symbols or UL symbols that can be used as sub-band DL BWP. The signaling can carry indications of the configuration of the BWP and the configuration of the at least one subband BWP. For example, the signaling can include information indicative of the configuration of OFDM symbols for the BWP in time domain and the at least one specific type of symbols or the at least one specific symbol for the subband BWP.

The BWP can include symbols (e.g., OFDM symbols) of different types or having different attributes. For example, wireless communication node 102 or 202 can configure the BWP to include DL symbols, UL symbols, F symbols or a combination thereof. In some implementations, the at least one specific type of symbols or the at least one specific symbol can include or can be indicative of at least one of a symbol with a flexible (F) transmission direction, a symbol for a transmission direction that is opposite to a transmission direction of the subband BWP, or a symbol for a transmission direction that is the same as the transmission direction of the subband BWP. For instance, the subband BWP can be configured in DL symbols and/or F symbols, in UL symbols and/or F symbols, or in DL symbols and/or UL symbols. In some implementations, the subband BWP can be configured to reside in a set of symbols (e.g., OFDM symbols) specified based on respective symbol indices.

In some implementations, the wireless communication node 102 or 202 can configure a first subband BWP for a first transmission direction, and a second subband BWP for a second transmission direction within the BWP. For instance, the first subband BWP can be for DL transmission (denoted herein as subband DL BWP) and the second subband BWP can be for UL transmission (denoted herein as subband UL BWP). Since the sub-band DL BWP and the sub-band UL BWP are within the same BWP, the delay for switching between the sub-band DL BWP and the sub-band UL BWP (or vice versa) can be minimized or even avoided (e.g., zero delay). In some implementations, the subband DL BWP and/or the subband UL BWP can be directly configured in the bandwidth corresponding to a cell or carrier. That is, a sub-band BWP can be a BWP instead of a sub-band BWP configured within the BWP. In such implementations, the BWP can be an optional configuration (e.g., it may or may not configured).

Figure 5:
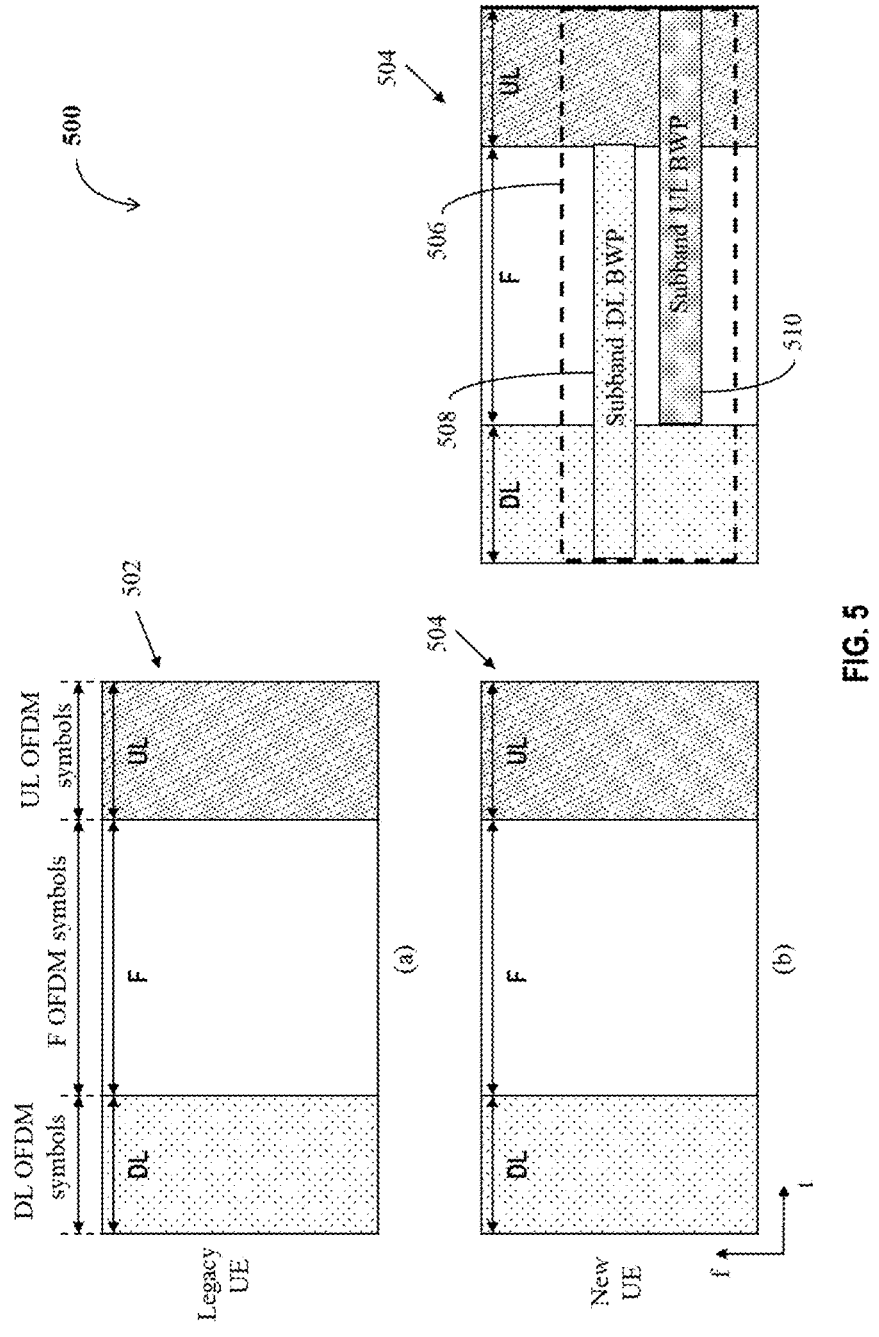
FIG. 5 shows a first example of a time-frequency resource configuration, according to example embodiments of the current disclosure.

Referring now to FIG. 5, a first example of a time-frequency resource configuration 500 in a TDD system is shown, according to example embodiments of the current disclosure. As used herein, a slot can refer to a sequence of consecutive OFDM symbols. The wireless communication system 100 or 200 or the wireless communication node 102 or 202 can configure the same slot structure for both wireless communication devices or UEs (referred to herein as old UEs) that do not support the time-frequency resource con-figurations described herein and wireless communication devices or UEs (referred to herein as new UEs) that support the time-frequency resource configurations described herein. For instance, the slot structures 502 and 504, which are the same structure, are configured for the old UEs and new UE, respectively. Both slot structures 502 and 504 can include a sequence of consecutive DL OFDM symbols, a sequence of consecutive flexible (F) OFDM symbols, and a sequence of UL OFDM symbols. The DL symbols, the F symbols and the UL symbols can be arranged according to any order in the slot structures 502 and 504.

For new UEs, the wireless communication system 100 or 200 or the wireless communication node 102 or 202 can configure BWP 506 within the slot 504. The frequency range of the BWP 506 can be smaller than or equal to the frequency range of the OFDM symbols in the slot 504. Configuring the BWP 506 can include specifying a fre-quency range of the BWP and a time duration (e.g., in terms of OFDM symbols and/or resource blocks). The wireless node 102 or 202 can configure the BWP 506 without explicit DL or UL attributes. For instance, the BWP 506 as config-ured may have neither a DL attribute nor an UL attribute.

The wireless communication node 102 or 202 can con-figure one or more DL subbands 508 (denoted herein as subband DL BWP(s) 508) for DL data transmission and one or more UL subbands 510 (denoted as subband UL BWP(s) 510) for UL data transmission within the BWP 506. The wireless communication node 102 or 202 can determine the frequency range and the time duration for each of the subband DL BWP(s) 508 and each of the subband UL BWP(s) 510. The frequency range of each of the subband DL BWP(s) 508 and each of the subband UL BWP(s) 510 can be smaller than the frequency range of the BWP 506. In the time domain, the wireless communication node 102 or 202 can configure the sub-band DL BWPs 508 in one or more specific DL symbols and/or one or more specific flexible (F) symbols of the BWP 506, and can configure the subband UL BWPs 510 in one or more specific UL symbols and/or one or more specific F symbols of the BWP 506. In some implementations, the wireless communication node 102 or 202 can configure the DL and F symbol types for the subband DL BWP(s) 508, and can configure the UL and F symbol types for the subband UL BWP(s) 510. In such implementations, the subband DL BWP(s) 508 can extend, in the time domain, across all DL and F symbols of the BWP 506, and the subband UL BWP(s) 510 extend, in the time domain, across all UL and F symbols of the BWP 506.

In some implementations, the wireless communication node 102 or 202 can skip one or more symbols (e.g., OFDM symbols) within the BWP 506 when configuring the subband DL BWP 508 and/or the subband UL BWP 510. For example, with reference to FIG. 5, the skipped symbols for the subband DL BWP 508 can include one or more DL symbols at the beginning of the BWP 506 and/or one or more F symbols at the end of the F region in the BWP 506. The skipped symbols for the subband UL BWP 510 can include one or more F symbols at the beginning of the F region in the BWP 506 and/or one or more UL symbols at the end of the BWP 506. In such example, the subband DL BWP 508 can be a continuous subband and/or the subband UL BWP 510 can be a continuous subband within the BWP 506. In some implementations, the skipped symbols can cause the subband DL BWP 508 and/or the subband UL BWP 510 to be discontinuous, e.g., with the skipped sym-bols separating to portions of the subband DL BWP 508 and/or the subband UL BWP 510.

The skipped symbols can be configured by the wireless communication node 102 or 202 or agreed upon between the wireless communication node 102 or 202 and the wireless communication device 104 or 204. For instance, the signal-ing between the wireless communication node 102 or 202 and the wireless communication device 104 or 204 can include indication(s) of the skipped symbols, or the skipped signals can be fixed ad known to both the wireless commu-nication node 102 or 202 and the wireless communication device 104 or 204. The indication(s) of the skipped symbols in the signals can be implicit. For example, the signaling can indicate the symbols within which a subband BWP resides where the symbols may be discontinuous with one or more gaps corresponding to skipped symbols.

The wireless communication node 102 or 202 can use RRC signaling, MAC CE signaling and/or DCI signaling to indicate to the wireless communication device 104 or 204 the specific UL symbols, specific DL symbols and/or spe-cific F symbols to host a subband BWP, such as the subband DL BWP 508 or subband UL BWP 510. The signaling can include an indication of the type or attribute of the subband BWP, e.g., DL or UL. In other words, the signaling can include an indication of whether a configured subband BWP is a subband DL BWP or subband UL BWP.

The wireless communication device 104 or 204 can use the received signaling to identify or determine time and frequency limits of a configured BWP, time and frequency limits of any subband BWP configured within the BWP and/or the type(s) or attribute(s) of the subband BWP(s) configured within the BWP. For example, the wireless communication device 104 or 204 can determine, based on the signaling received from the wireless communication node 102 or 202, a frequency range (e.g., in terms of subcarriers), a time duration (e.g., in terms of OFDM symbols or RBs) and/or a type or attribute (e.g., DL or UL) of a configured subband BWP. If the type or attribute is indicative of DL, the wireless communication device 104 or 204 can determine that the subband is a subband DL BWP, and receive data from the wireless communication node 102 or 202 over the subband DL BWP. If the type or attribute is indicative of UL, the wireless communication device 104 or 204 can determine that the subband is a subband UL BWP, and transmit data to the wireless communication node 102 or 202 over the subband UL BWP.

In some implementations, the wireless communication node 102 or 202 can configure the wireless communication device 104 or 204 with multiple BWPs. The frequency domain resources of the multiple BWPs can be overlapping. Different BWPs can contain the same number or different numbers of symbols in the time domain. Different BWPs can contain the same type(s) (e.g., DL, UL and/or F) or different types (e.g., DL, UL and/or F) of symbols. The wireless communication node 102 or 202 can configure multiple subband DL BWPs 508 and/or multiple subband UL BWPs 510 within the BWP 506. Different subband DL BWPs can contain the same or different symbols (e.g., with respect to the type(s), location(s) and/or number(s) of symbols) in the time domain. Similarly, different subband UL BWPs can contain the same or different symbols (e.g., with respect to the type(s), location(s) and/or number(s) of symbols) in the time domain.

Figure 6:
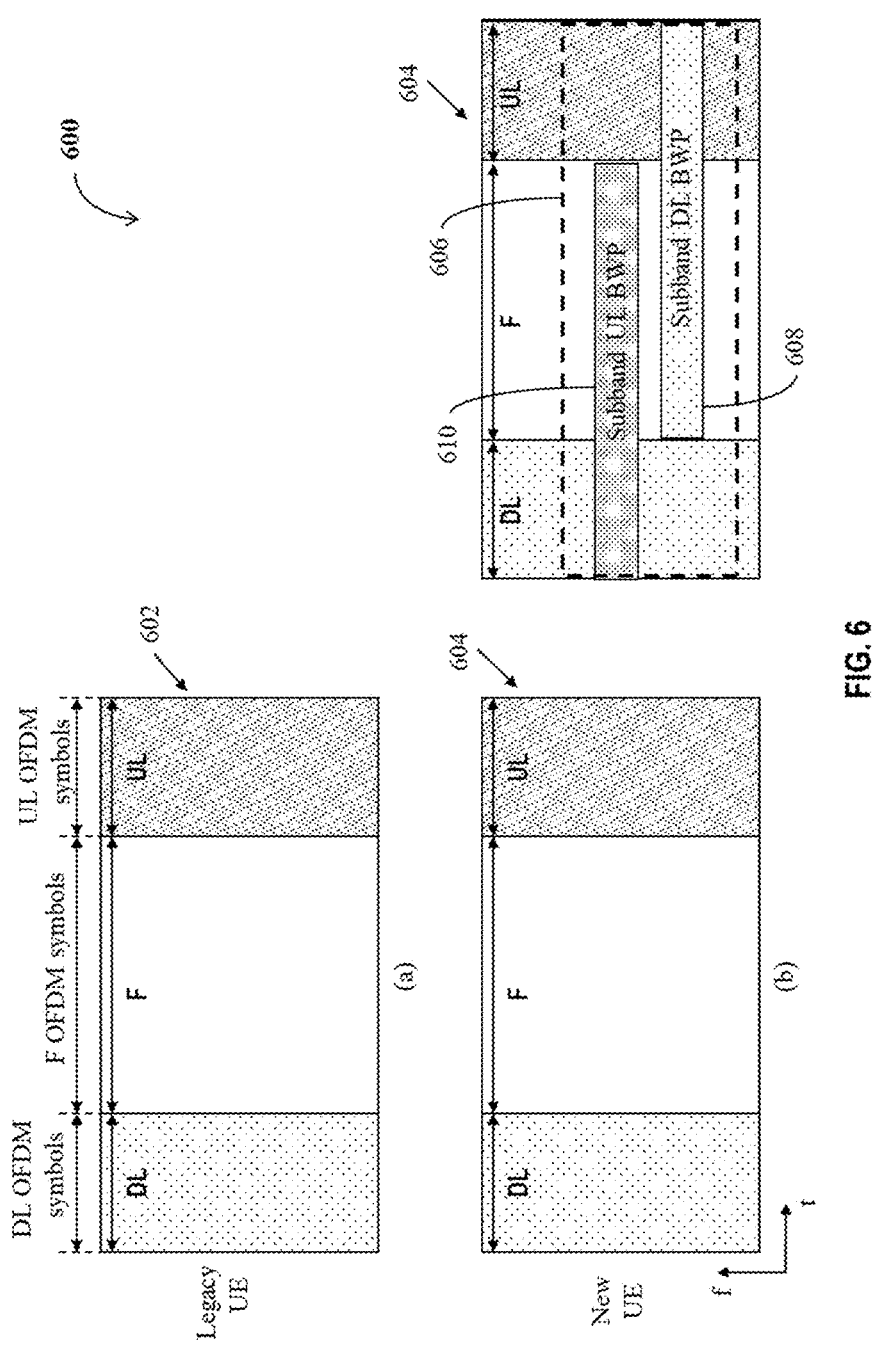
FIG. 6 shows a second example of a time-frequency resource configuration, according to example embodiments of the current disclosure.

Referring now to FIG. 6, a second example of a time-frequency resource configuration 600 in a TDD system is shown, according to example embodiments of the current disclosure. The slot structures 602 and 604 for old and new UEs, respectively, are the same and are similar to the slot structures 501 and 504 of FIG. 5. Also, the wireless communication node 102 or 202 can configure the BWP 606 in a similar was the configuration of the BWP 506 described above in relation with FIG. 5. For example, the frequency range of the BWP 606 can be smaller than or equal to the frequency range of the OFDM symbols in the slot 604. Configuring the BWP 606 can include specifying a frequency range (e.g., in terms of subcarriers) and a time duration (e.g., in terms of OFDM symbols and/or RBs) of the BWP. The wireless node 102 or 202 can configure the BWP 606 without explicit DL or UL attributes. For instance, the BWP 606 as configured may have neither a DL attribute nor an UL attribute.

The wireless communication node 102 or 202 can configure one or more DL subbands 608 (denoted herein as subband DL BWP(s) 608) for DL data transmission and one or more UL subbands 610 (denoted as subband UL BWP(s) 610) for UL data transmission within the BWP 606. The wireless communication node 102 or 202 can determine the frequency range and the time duration for each of the subband DL BWP(s) 608 and each of the subband UL BWP(s) 610. The frequency range of each of the subband DL BWP(s) 608 and each of the subband UL BWP(s) 610 can be smaller than the frequency range of the BWP 606. In the time domain, the wireless communication node 102 or 202 can configure the sub-band DL BWPs 608 in one or more specific UL symbols and/or one or more specific flexible (F) symbols of the BWP 606, and can configure the subband UL BWPs 610 in one or more specific UL symbols and/or one or more specific F symbols of the BWP 606. In some implementations, the wireless communication node 102 or 202 can configure the UL and F symbol types for the subband DL BWP(s) 608, and can configure the DL and F symbol types for the subband UL BWP(s) 610. In such implementations, the subband DL BWP(s) 608 can extend, in the time domain, across all UL and F symbols of the BWP 606, and the subband UL BWP(s) 610 extend, in the time domain, across all DL and F symbols of the BWP 606.

In some implementations, the wireless communication node 102 or 202 can skip one or more symbols (e.g., OFDM symbols) within the BWP 506 when configuring the subband DL BWP 608 and/or the subband UL BWP 610. For example, with reference to FIG. 6, the skipped symbols for the subband DL BWP 608 can include one or more F symbols at the beginning of the F region and/or one or more UL symbols at the end of the BWP 606. The skipped symbols for the subband UL BWP 610 can include one or more DL symbols at the beginning of the BWP 606 and/or one or more F symbols at the end of the F region in the BWP 606. In such example, the subband DL BWP 608 can be a continuous subband and/or the subband UL BWP 610 can be a continuous subband within the BWP 606. In some implementations, the skipped symbols can cause the subband DL BWP 608 and/or the subband UL BWP 610 to be discontinuous, e.g., with the skipped symbols separating to portions of the subband DL BWP 608 and/or the subband UL BWP 610.

The wireless communication node 102 or 202 can send the configuration of the BWP 606 and/or the subband BWPs 608 and 610 to the wireless communication device 104 or 204 using signaling, such as RRC signaling, MAC CE signaling and/or DCI signaling, as discussed above with regard to FIG. 5. The wireless communication device 104 or 204 can use the received signaling to identify or determine time and frequency limits of a configured BWP, time and frequency limits of any subband BWP configured within the BWP and/or the type(s) or attribute(s) of the subband BWP(s) configured within the BWP. According to the configuration of the subband DL BWP 608 and the subband UL BWP 610, portions or resource elements of some DL symbols (e.g., DL symbols hosting a portion of the subband UL BWP 610) can be used for UL transmission and/or portions or resource elements of some UL symbols (e.g., UL symbols hosting a portion of the subband DL BWP 608) can be used for DL transmission. That is, some symbols can be used for transmissions that are inverse or opposite to the properties (e.g., DL or UL) of the symbols.

In subband BWP configurations having a subband BWP that is configured for uplink transmission direction (e.g., subband UL BWP) and includes at least one symbol with a flexible transmission direction, as described in relation with FIGS. 5 and 6, the wireless communication device 104 or 204 can transmit or receive data over the subband BWP according to one or more rules. For instance, the wireless communication device 104 or 204 can transmit or receive data over the subband UL BWP 510 or subband UL BWP 610, according to any combination of the rules (e.g., Rule 1 to Rule 5) below.

Rule 1: In the case where a subband BWP is configured to include at least one symbol with a flexible transmission direction and the subband BWP is configured for uplink transmission direction (e.g., subband UL BWP), the wireless communication node 102 or 202 can configure the first subband BWP to not overlap in the frequency domain with a downlink signal or channel that is common to one or more wireless communication devices. For instance, the subband UL BWP 510 can be configured not to overlap with a synchronization signal block (SSBs) and/or CORESET #0 in the frequency domain. In other words, the wireless communication device 104 or 204 may not be allowed to receive SSB and/or CORESET #0 in the F symbols of the frequency domain resources corresponding to the subband UL BWP 510. However, the wireless communication device 104 or 204 may be allowed to receive SSB and/or CORESET #0 in the F symbols of frequency domain resources other than the frequency domain resources corresponding to the subband UL BWP 510. The wireless communication device 104 or 204 can be allowed to transmit UL data in all symbols (including F symbols) contained in the subband UL BWP. However, if the subband UL BWP 510 is configured to contain F symbols, the wireless communication device 104 or 204 can transmit SSB and/or CORESET #0 in F symbols from frequency domain resources other than the frequency domain resources corresponding to the subband UL BWP 510 because the wireless communication device 104 or 204 is a half-duplex device. The wireless communication device 104 or 204 does not expect (e.g., no schedule) to transmit UL data over F symbols of the subband UL BWP simultaneously while receiving the SSB and/or CORESET #0 is located.

Rule 2: In the case where a subband BWP is configured to include at least one symbol with a flexible transmission direction and the subband BWP is configured for uplink transmission direction (e.g., subband UL BWP), the wireless communication node 102 or 202 can configure the subband BWP to overlap in the frequency domain with a downlink signal or channel that is common to one or more wireless communication devices. The downlink signal or channel may not be received by the wireless communication device 104 or 204 in the at least one symbol with the flexible transmission direction of the subband UL BWP. For example, subband UL BWP 510 can be configured to overlap with SSB and/or CORESET #0 in frequency domain (including partial overlap). However, the wireless communication device 104 or 204 would not expect to receive the SSB and/or CORESET #0 over the subband UL BWP. For example, the wireless communication node 102 or 202 may be configured to transmit SSB and/or CORESET #0 to over the subband UL BWP 510 to an old UE (e.g., a UE that does not support time-frequency resource configurations described herein). However, new UEs will not receive the SSB and/or CORESET #0 over the subband UL BWP 510 in order to simplify UE capabilities (e.g., the UE supports half-duplex communications).

Rule 3: In the case where a subband BWP is configured to include at least one symbol with a flexible transmission direction and the subband BWP is configured for uplink transmission direction (e.g., subband UL BWP), the wireless communication node 102 or 202 can configure the subband BWP to overlap in the frequency domain with a downlink signal or channel that is common to one or more wireless communication devices. The downlink signal or channel may be received by the wireless communication device 104 or 204 in the symbol with the flexible transmission direction, within which the wireless communication device 104 or 204 may not be scheduled to transmit uplink data. For example, the subband UL BWP 510 can be configured to overlap with SSB and/or CORESET #0 in the frequency domain (including partial overlap). A new UE (e.g., supporting time-frequency resource configurations described herein) can receive SSB and/or CORESET #0 in F symbols of the subband UL BWP 510. When the new UE receives SSB and/or CORESET #0 in some F symbols of the subband UL BWP 510, the new UE does not expect to be scheduled to transmit UL data in the same F symbols.

Rule 4: In the case where a subband BWP is configured to include at least one symbol with a flexible transmission direction and the subband BWP is configured for uplink transmission direction (e.g., subband UL BWP), the wireless communication node 102 or 202 can configure the subband BWP to overlap in the frequency domain with a downlink signal or channel that is common to one or more wireless communication devices. The subband BWP can exclude symbols in the time domain where the downlink signal or channel is located. For example, subband UL BWP 510 can be configured to overlap with SSB and/or CORESET #0 in frequency domain (including partial overlap). However, in the time domain, the subband UL BWP 510 does not contain DL symbols where the SSB and/or CORESET #0 are located. That is, the subband UL BWP 510 does not actually contain symbols of SSB and/or CORESET #0 in the time domain. In other words, the subband UL BWP 510 can skip the DL symbols where the SSB and/or CORESET #0 are located by default, and other DL symbols can be included in the subband UL BWP 510.

Rule 5: In the case where a subband BWP is configured to include at least one symbol with a flexible transmission direction and the subband BWP is configured for uplink transmission direction (e.g., subband UL BWP), the wireless communication node 102 or 202 can configure the subband BWP to overlap in the frequency domain with a downlink signal or channel that is common to one or more wireless communication devices. If the wireless communication device 104 or 204 is scheduled to perform uplink transmission on a resource that overlaps in the time domain with a resource of the downlink signal or channel, the wireless communication device 104 or 204 can skip the uplink transmission on the resource that overlaps in the time domain with the resource of the downlink signal or channel. For example, the subband UL BWP 510 or 610 can be configured to overlap with SSB and/or CORESET #0 in the frequency domain (including partial overlap), and in the time domain, if the wireless communication device 104 or 204 is scheduled to perform uplink transmission with resources that overlap with resources corresponding to SSB and/or CORESET #0, then the wireless communication device 104 or 204 does not expect to perform the uplink transmission (e.g., the wireless communication device 104 or 204 can cancel the uplink transmission, or cancel the uplink transmission at least on the overlapping time domain resources). The wireless communication device 104 or 204 can be allowed to receive SSB and/or CORESET #0 over the subband UL BWP 510 or 610. UL transmissions can be supported in the sub-band UL BWP 510 or 610 in F symbols other than the F symbols where SSB and/or CORESET #0 are located.

In the above rules Rule 1 to Rule 5, SSB and/or CORESET #0 are just an example of the common downlink signal or channel of any cell. Here, common downlink signals/channels can include but are not limited to SSB, CORESET #0, initial BWP, CORESET for other common channels, various types of system information blocks and reference signals (e.g., demodulation reference signal (DMRS), channel status information-reference signal (CSI-RS) for various purposes, positioning reference signal, reference signal for synchronization tracking, etc.).

In subband BWP configurations having a subband BWP that is configured for downlink transmission direction (e.g., subband DL BWP) and includes at least one symbol with a flexible transmission direction, as described in relation with FIGS. 5 and 6, the wireless communication device 104 or 204 can transmit or receive data over the subband BWP according to one or more rules. For instance, the wireless communication device 104 or 204 can transmit or receive data over the subband DL BWP 508 or subband DL BWP 608, according to any combination of the rules (e.g., Rule 6 to Rule 10) below.

Rule 6: In the case where a subband BWP is configured to include at least one symbol with a flexible transmission direction and the subband BWP is configured for downlink transmission direction (e.g., subband DL BWP), the wireless communication node 102 or 202 can configure the subband BWP to not overlap in the frequency domain with an uplink signal or channel that is common to one or more wireless communication devices. For example, the subband DL BWP 508 or 608 can be configured not to overlap with PRACH and/or cell common PUCCH in frequency domain. The wireless communication device 104 or 204 may not be allowed to transmit PRACH and/or cell common PUCCH in the F symbols from the frequency domain resources corresponding to the subband DL BWP. However, the wireless communication device 104 or 204 can be allowed to transmit PRACH and/or cell common PUCCH in the F symbols of frequency domain resources other than the frequency domain resources corresponding to the subband DL BWP 508 or 608. The wireless communication device 104 or 204 can be allowed to receive DL data in all symbols (including F symbols) contained in the subband DL BWP 508 or 608. However, if the subband DL BWP 508 or 608 is configured to contain F symbols, the wireless communication node 102 or 202 can receive PRACH and/or cell common PUCCH in F symbols of frequency domain resources other than the frequency domain resources corresponding to the subband DL BWP 508 or 608. When the transmitting the PRACH and/or cell common PUCCH in some F symbols of the subband DL BWP 508 or 608, the wireless communication device 104 or 204 would not expect to (be scheduled to) receive DL data over the subband DL BWP 508 or 608 in the F symbol where the PRACH and/or cell common PUCCH is located.

Rule 7: In the case where a subband BWP is configured to include at least one symbol with a flexible transmission direction and the subband BWP is configured for downlink transmission direction (e.g., subband DL BWP), the wireless communication node 102 or 202 can configure the subband BWP to overlap in the frequency domain with an uplink signal or channel that is common to one or more wireless communication devices. The uplink signal or channel may not be transmitted by the wireless communication device 104 or 204 in the at least one symbol with the flexible transmission direction. For example, subband DL BWP 508 or 608 can be configured to overlap PRACH and/or cell common PUCCH in frequency domain (including partial overlap). But the new UE does not transmit the PRACH and/or cell common PUCCH in the F symbols from this subband DL BWP. This approach is beneficial to simplify UE capabilities (e.g., UE would support half-duplex but not full-duplex). However, the wireless communication node 102 or 202 can receive PRACH and/or cell common PUCCH in the F symbol over the subband DL BWP 508 or 608 from legacy UEs if the PRACH and/or cell common PUCCH are configured in the F symbol and in a frequency domain resource corresponding to the subband DL BWP 508 or 608.

Rule 8: In the case where a subband BWP is configured to include at least one symbol with a flexible transmission direction and the subband BWP is configured for downlink transmission direction (e.g., subband DL BWP), the wireless communication node 102 or 202 can configure the subband BWP to overlap in the frequency domain with an uplink signal or channel that is common to one or more wireless communication devices. The uplink signal or channel may be transmitted by the wireless communication device 104 or 204 in the symbol(s) with the flexible transmission direction, within which the wireless communication device 104 or 204 is not scheduled to receive downlink data. For example, subband DL BWP 508 or 608 can be configured to overlap with PRACH and/or cell common PUCCH in frequency domain (including partial overlap). A new UE with higher capability can transmit PRACH and/or cell common PUCCH in F symbols of the subband DL BWP 508 or 608. When the new UE transmits PRACH and/or cell common PUCCH in the F symbol of the subband DL BWP 508 or 608, the new UE would not expect to receive DL data in the F symbols.

Rule 9: In the case where a subband BWP is configured to include at least one symbol with a flexible transmission direction and the subband BWP is configured for downlink transmission direction (e.g., subband DL BWP), the wireless communication node can configure the subband BWP to overlap in the frequency domain with an uplink signal or channel that is common to one or more wireless communication devices. The subband BWP can exclude symbols in the time domain where the uplink signal or channel is located. For example, the subband DL BWP 508 or 608 can be configured to overlap PRACH and/or cell common PUCCH in frequency domain (including partial overlap). However, in the time domain, the subband DL BWP 508 or 608 may not contain the F symbols where the PRACH and/or cell common PUCCH are located. That is, the subband DL BWP 508 or 608 may not actually contain symbols of PRACH and/or cell common PUCCH in the time domain. In other words, the subband DL BWP 508 or 608 will skip the F symbols where the PRACH and/or cell common PUCCH are located by default, and other F symbols are included.

Rule 10: In the case where a subband BWP is configured to include at least one symbol with a flexible transmission direction and the subband BWP is configured for downlink transmission direction (e.g., subband DL BWP), the wireless communication node 102 or 202 can configure the subband BWP to overlap in the frequency domain with an uplink signal or channel that is common to one or more wireless communication devices. If the wireless communication device 104 or 204 is scheduled to perform downlink reception on a resource that overlaps in the time domain with the resource of the uplink signal or channel, the wireless communication device 104 or 204 can skip the downlink reception on the resource that overlaps in the time domain with the resource of the uplink signal or channel. For example, subband DL BWP 508 or 608 can be configured to overlap with PRACH and/or cell common PUCCH in the frequency domain (including partial overlap). In the time domain, if the wireless communication device 104 or 204 can be scheduled to perform downlink reception with resources that overlap with resources corresponding to PRACH and/or cell common PUCCH, then the wireless communication device 104 or 204 would not expect to perform the downlink reception (e.g., the UE cancels the downlink reception, or cancels the downlink reception at least on the overlapping time domain resources). The wireless communication device 104 or 204 can be allowed to transmit PRACH and/or cell common PUCCH over the subband DL BWP 508 or 608. The downlink reception can be supported in the sub-band DL BWP in F symbols other than the F symbols where PRACH and/or cell common PUCCH are located.

In the above rules Rule 6 to Rule 10, the PRACH and/or cell common PUCCH are examples of the cell common uplink signal/channel. Common uplink signals/channels can include but are not limited to PRACH, cell common PUCCH, initial BWP and reference signals (e.g., DMRS, SRS, etc.).

Figure 7:
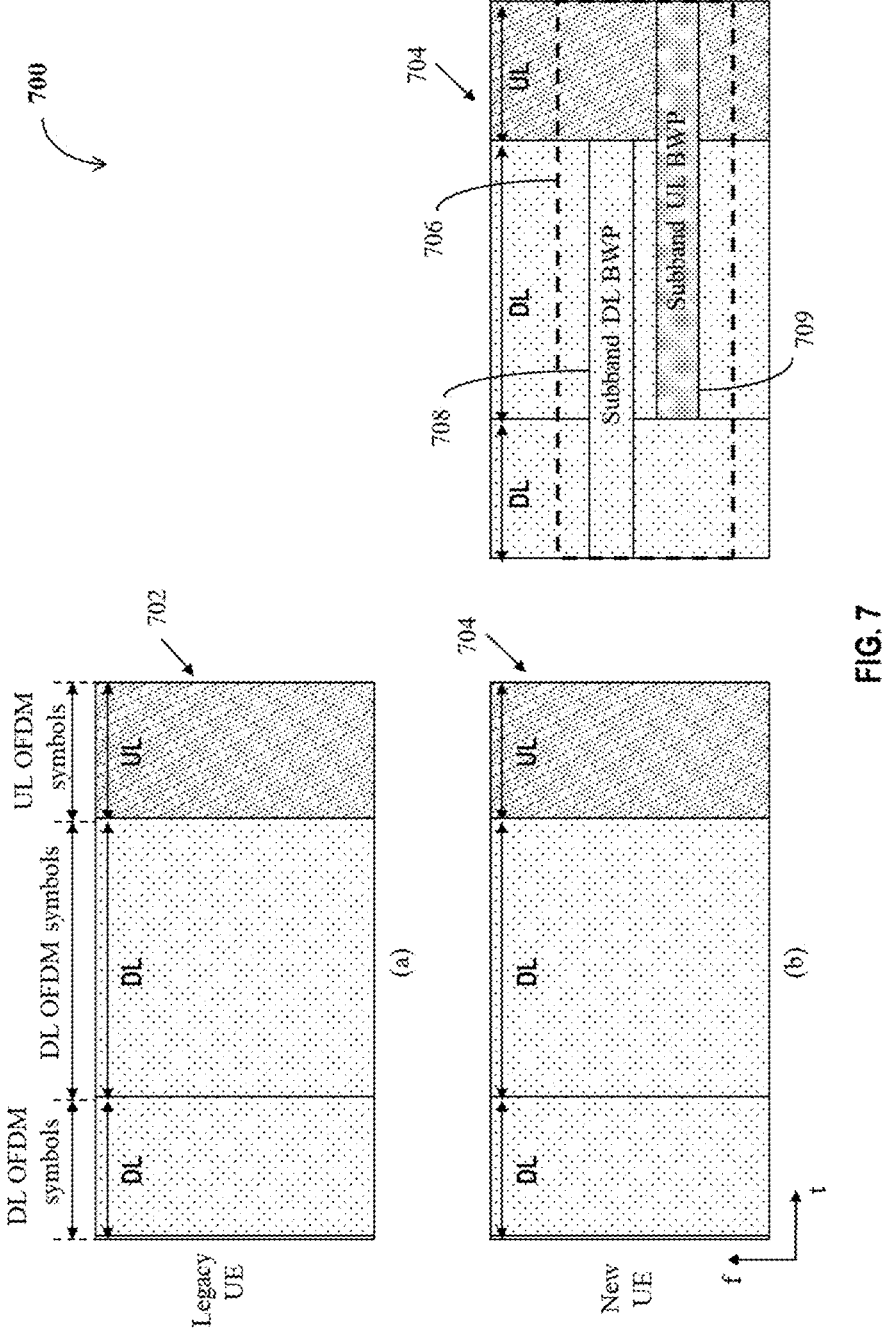
FIG. 7 shows a third example of a time-frequency resource configuration, according to example embodiments of the current disclosure.

Referring now to FIG. 7, a third example of a time-frequency resource configuration 700 in a TDD system is shown, according to example embodiments of the current disclosure. In FIG. 7, the slot structures 702 and 704 configured by the wireless communication node 102 or 202 for legacy (or old) UEs and new UEs, respectively, are the same. Both slot structures 702 and 704 include DL symbols and UL symbols. Compared to the configuration 500 of FIG. 5, the F symbols in the intermediate region of the slot structures 502 and 504 are replaced with DL symbols in the slot structures 702 and 704 of FIG. 7. Apart from this difference, the wireless communication node 102 or 202 can use a similar configuration mechanism as described above with regard to FIG. 5 to configure BWP 706 and configure one or more subband BWPs (e.g., subband DL BWP 708 and subband UL BWP 710) in the BWP 706. The intermediate region (e.g., including the F symbols in symbol structures 502 and 504, and including DL symbols in slot structures 702 and 704) of the slot can be configured by the wireless communication node 102 or 202, or pre-agreed upon between the wireless communication node 102 or 202 and the wireless communication device 104 or 204. Note that the intermediate region here is just an example of some OFDM symbols in the middle of the slot. More generally, these symbols can be located anywhere within the slot. In these symbols, it is allowed to configure BWPs or subband BWPs with opposite transmission directions (e.g., with respect to the transmission direction(s) of one or more symbol(s)). Some or all of the frequency domain resources of these symbols can be configured to perform opposite transmission directions compared to the transmission direction(s) of the symbols. These symbols in the slot can be configured by the wireless communication node 102 or 202, or pre-agreed upon between the wireless communication node 102 or 202 and the wireless communication device 104 or 204.

The BWP 706 can have a frequency range smaller than or equal to the frequency range of symbols (e.g., OFDM symbols). Configuring the BWP 706 can include the wireless communication node 102 or 202 determining or specifying the frequency range (e.g., in terms of subcarriers) and a time duration (e.g., in terms of OFDM symbols or RBs) of the BWP 706. Configuring the subband BWP(s) can include the wireless communication node 102 or 202 configuring at least one symbol type for each subband BWP. For example, the wireless communication node 102 or 202 can configure DL OFDM symbols for the subband DL BWP 708, and can configure DL and UL OFDM symbols for the subband UL BWP 710. Accordingly, the subband DL BWP 708 can extend along all or some of the DL symbols of the BWP 706 in the time domain, and the subband UL BWP 710 can extend along all or some of the DL OFDM symbols and all or some of the UL OFDM symbols of the BWP 706 in the time domain. The frequency range of the subband UL BWP 710 can extend across all or part of the frequency domain resources of the DL and UL symbols. The frequency range of the subband DL BWP 708 can extend across can extend across all or part of the frequency domain resources of the DL symbols.

In some implementations, and similar to the description above with regard to FIG. 5, configuring a subband BWP can include skipping one or more symbols. For example, the wireless communication node 102 or 202 can skip one or more DL symbols in configuring the subband DL BWP 708. The wireless communication node 102 or 202 may skip one or more DL symbols and/or one or more UL symbols in configuring the subband UL BWP 710. The subband DL BWP 708 and/or the subband UL BWP 710 can be continuous or discontinuous with gaps due to skipping of OFDM frames.

Configuring the BWP 706 and/or the subband BWPs 708 and 710 can include the wireless communication node 102 or 202 sending or signaling indications of the parameters (e.g., frequency ranges and/or time durations) of the BWP 706 and/or the subband BWPs 708 and 710 to the wireless communication device 104 or 204. As discussed above with regard to FIG. 5, new signaling (e.g., RRC signaling, MAC CE signaling or DCI signaling) can be introduced to configure the BWP 706. The BWP 706 may be configured with no explicit DL or UL attributes. The wireless communication node 102 or 202 can determine or specify DL symbols for each of one or more subband DL BWPs 708 and/or can determine or specify DL and UL symbols for each of one or more subband UL BWPs 710. The wireless communication node 102 or 202 can configure the subband DL BWP(s) 708 and/or the subband UL BWPs 710 through signaling (e.g., RRC signaling, MAC CE signaling or DCI signaling) or pre-agreement between the wireless communication node 102 or 202 and the wireless communication device 104 or 204. For instance, the wireless communication node 102 or 202 can signal or send the parameters (e.g., type(s) of OFDM symbols, location(s) of OFDM symbols within the BWP 706, frequency range, etc.) defining each subband BWP in the BWP 706. If symbols are skipped when configuring any of the subband BWPs, the skipped symbols can be configured by the wireless communication node 102 or 202 (e.g., determined and signaled to the wireless communication device 104 or 204) or pre-agreed upon between the wireless communication device 104 or 204 and the wireless communication node 102 or 202. In general, signaling of the configuration parameters of the BWP 706 and/or parameters of any subband BWP in the BWP 706 can be performed as discussed above with regard to FIG. 5. With regard to the subband UL BWP 710, resource elements or portions of DL symbols within the subband UL BWP 710 are configured for uplink transmission opposite to their initial property or type. In some implementations, the subband DL BWP 708 and the subband UL BWP 710 can also be directly configured in the bandwidth corresponding to a cell or carrier.

Upon receiving the signaling, the wireless communication device 104 or 204 can determine the BWP 706 and/or any subband BWPs therein. The wireless communication device 104 or 204 can determine the property or type of each subband BWP (e.g., subband DL BWP or subband UL BWP). The wireless communication device 104 or 204 can transmit or receive data according to the configured subband DL BWP(s) 708 or subband UL BWP(s) 710. Since the subband DL BWP(s) 708 or subband UL BWP(s) 710 are configured within the BWP 706, the subband DL BWP(s) 708 and the subband UL BWP(s) 710 are treated by the wireless communication device 104 or 204 as having the same center frequency point (e.g., the center frequency of the BWP 706). As a result, the switching delay between the sub-band DL BWP(s) 708 and the sub-band UL BWP(s) 710 are minimized or even reduced to zero. Signaling and decoding of the configuration parameters can be performed as discussed above in relation to FIG. 5.

In some implementations, the BWP 706 can include at least one subband DL BWP 708 and/or at least one subband UL BWP 710. The wireless communication device 104 or 204 can be configured with multiple BWPs 706, and the frequency domain resources of the multiple BWPs can overlap. Different BWPs 706 can contain the same or different type(s) or number(s) of symbols in the time domain. For example, the types of symbols contained in the first BWP and the second BWP may be different. Multiple subband DL BWPs 708 and/or multiple subband UL BWPs 710 can be configured within one BWP 706. Different subband DL BWPs 708 can contain the same or different number(s), location(s) (e.g., indices) or type(s) of symbols in the time domain. Different subband UL BWPs 710 can contain the same or different number(s), location(s) (e.g., indices) or type(s) of symbols in the time domain.

In subband BWP configurations having a subband BWP that is configured for uplink transmission direction (e.g., subband UL BWP) and includes at least one symbol with a downlink transmission direction, as described in relation with FIG. 7, the wireless communication device 104 or 204 can transmit or receive data over the subband BWP according to one or more rules. For instance, the wireless communication device 104 or 204 can transmit or receive data over the subband UL BWP 710 according to any combination of the rules (e.g., Rule 11 to Rule 15) below.

Rule 11: In the case where a subband BWP is configured to include at least one symbol with a downlink transmission direction and the subband BWP is configured for uplink transmission direction (e.g., subband UL BWP 710), the wireless communication node can configure the subband BWP to not overlap in the frequency domain with a downlink signal or channel that is common to one or more wireless communication devices. For example subband UL BWP 710 can be configured not to overlap with SSB and/or CORESET #0 in frequency domain. The UE 104 or 204 may not be allowed to receive SSB and/or CORESET #0 in the DL symbols from the frequency domain resources corresponding to the subband UL BWP 710. However, the UE 104 or 204 may be allowed to receive SSB and/or CORE-SET #0 in the DL symbols from frequency domain resources other than the frequency domain resources corresponding to the subband UL BWP 710. The UE 104 or 204 may be allowed to transmit UL data in all symbols (including DL symbols) contained in the subband UL BWP 710. However, if the subband UL BWP 710 is configured to contain DL symbols, the base station 102 or 202 can transmit SSB and/or CORESET #0 in DL symbols from a frequency domain resources other than the frequency domain resources corresponding to the subband UL BWP 710. When receiving the SSB and/or CORESET #0, the UE 104 or 204 would not expect to (not scheduled to) transmit UL data from the subband UL BWP in the DL symbol where the SSB and/or CORESET #0 is located.

Rule 12: In the case where a subband BWP is configured to include at least one symbol with a downlink transmission direction and the subband BWP is configured for uplink transmission direction (e.g., subband UL BWP 710), the wireless communication node 102 or 202 can configure the subband BWP to overlap in the frequency domain with a downlink signal or channel that is common to one or more wireless communication devices. The downlink signal or channel may not be received by the wireless communication device 104 or 204 in the symbol with the downlink transmission direction. For example, subband UL BWP 710 can be configured to overlap SSB and/or CORESET #0 in frequency domain (including partial overlap). However, the new UE may not receive the SSB and/or CORESET #0 in the DL symbols of the subband UL BWP 710. This approach helps simplify UE capabilities (only half-duplex is supported but not full duplex). The base station 102 or 202 can transmit SSB and/or CORESET #0 in the DL symbol(s) of the subband UL BWP 710 for legacy UEs if the SSB and/or CORESET #0 are configured in the DL symbol and in a frequency domain resource corresponding to the subband UL BWP.

Rule 13: In the case where a subband BWP is configured to include at least one symbol with a downlink transmission direction and the subband BWP is configured for uplink transmission direction (e.g., subband UL BWP 710), the wireless communication node 102 or 202 can configure the subband BWP to overlap in the frequency domain with a downlink signal or channel that is common to one or more wireless communication devices 104 or 204. The downlink signal or channel may be received by the wireless communication device 104 or 204 in the symbol(s) with the downlink transmission direction, within which the wireless communication device 104 or 204 is not scheduled to transmit uplink data. For example, subband UL BWP 710 can be configured to overlap SSB and/or CORESET #0 in frequency domain (including partial overlap). New UEs with higher capability can receive SSB and/or CORESET #0 in DL symbols from the subband UL BWP 710. In this case, when receiving SSB and/or CORESET #0 in the some DL symbols of the subband UL BWP 710, the new UEs would not expect to be scheduled to transmit UL data in the DL symbols.

Rule 14: In the case where a subband BWP is configured to include at least one symbol with a downlink transmission direction and the subband BWP is configured for uplink transmission direction (e.g., subband UL BWP 710), the wireless communication node 102 or 202 can configure the subband BWP to overlap in the frequency domain with a downlink signal or channel that is common to one or more wireless communication devices 104 or 204. The subband BWP can exclude symbols in the time domain where the downlink signal or channel is located. For example, subband UL BWP 710 can be configured to overlap SSB and/or CORESET #0 in frequency domain (including partial overlap). However, in the time domain, the subband UL BWP 710 may not contain the DL symbols where the SSB and/or CORESET #0 are located. That is, the subband UL BWP 710 may not actually contain symbols of SSB and/or CORESET #0 in the time domain. In other words, the subband UL BWP 710 will skip the DL symbols where the SSB and/or CORE-SET #0 are located by default, and other DL symbols may be included in the subband UL BWP 710.

Rule 15: In the case where a subband BWP is configured to include at least one symbol with a downlink transmission direction and the subband BWP is configured for uplink transmission direction (e.g., subband UL BWP 710), the wireless communication node 102 or 202 can configure the subband BWP to overlap in the frequency domain with a downlink signal or channel that is common to one or more wireless communication devices. If the wireless communication device 104 or 204 is scheduled to perform uplink transmission on a resource that overlaps in the time domain with that of the downlink signal or channel, the wireless communication device 104 or 204 can skip the uplink transmission on the resource that overlaps in the time domain with that of the downlink signal or channel. For example, subband UL BWP can be configured to overlap with SSB and/or CORESET #0 in the frequency domain (including partial overlap), and in the time domain, if the UE 104 or 204 is scheduled to perform uplink transmission with resources that overlap with resources corresponding to SSB and/or CORESET #0, then the UE 104 or 204 may not expect to perform the uplink transmission (the UE can cancel the uplink transmission, or cancel the uplink transmission at least on the overlapping time domain resources). The UE 104 or 204 may be allowed to receive SSB and/or CORESET #0 from this subband UL BWP. UL transmissions can be supported in the sub-band UL BWP in DL symbols other than the DL symbols where SSB and/or CORESET #0 are located.

In the above rules 11 to 15, SSB and/or CORESET #0 are just examples of cell common downlink signal/channel. Common downlink signals/channels can include but are not limited to: SSB, CORESET #0, initial BWP, CORESET for other common channels, various types of system information blocks and reference signals (e.g., DMRS, CSI-RS for various purposes, positioning reference signal, reference signal for synchronization tracking, etc.).

Figure 8:
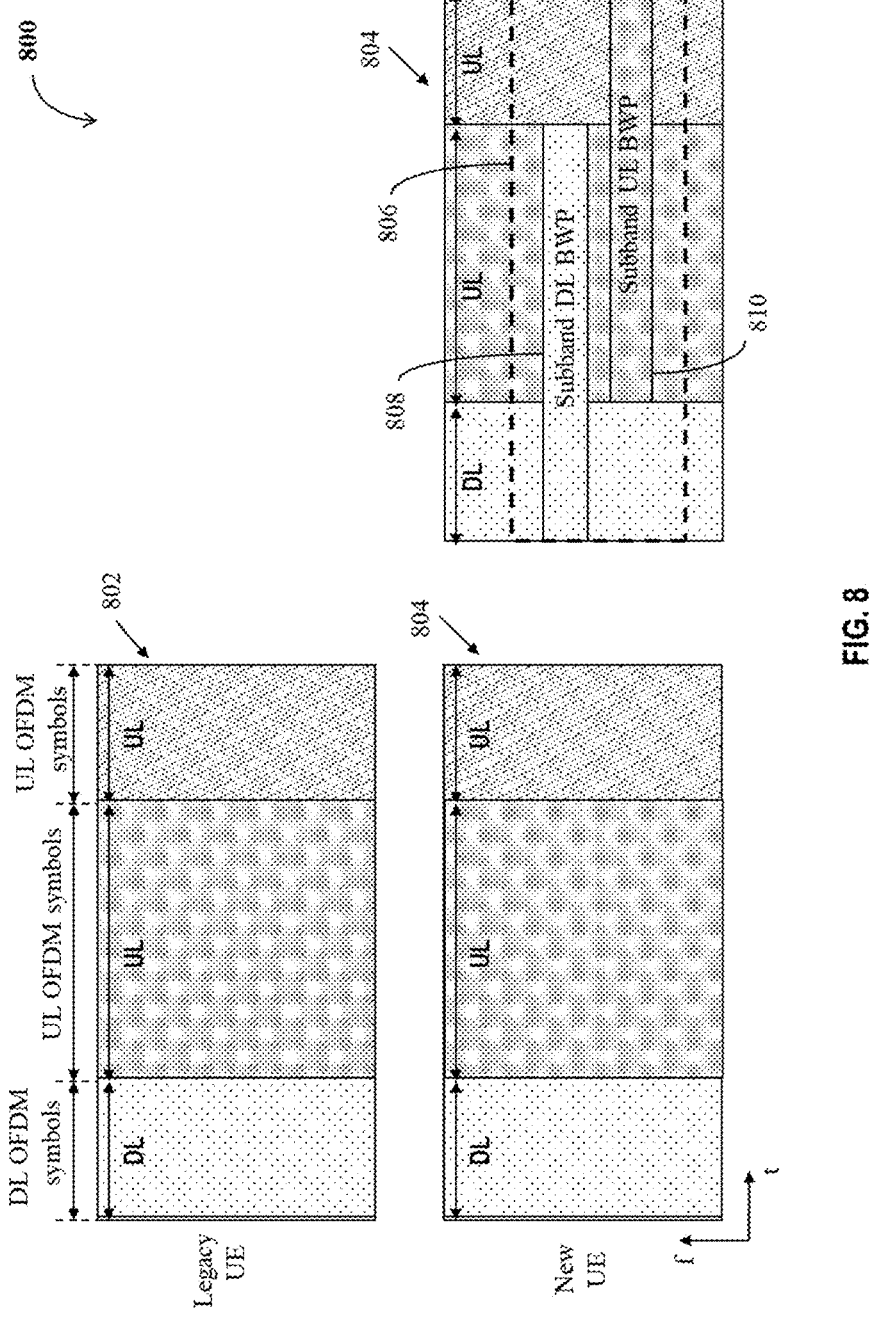
FIG. 8 shows a fourth example of a time-frequency resource configuration, according to example embodiments of the current disclosure.

Referring now to FIG. 8, a fourth example of a time-frequency resource configuration 800 in a TDD system is shown, according to example embodiments of the current disclosure. In FIG. 8, the slot structures 802 and 804 configured by the wireless communication node 102 or 202 for legacy (or old) UEs and new UEs, respectively, are the same. Both slot structures 802 and 804 include DL symbols and UL symbols. Compared to the configuration 500 of FIG. 5, the F symbols in the intermediate region of the slot structures 502 and 504 are replaced with UL symbols in the slot structures 802 and 804 of FIG. 8. Apart from this difference, the wireless communication node 102 or 202 can use similar configuration mechanisms as described above with regard to FIGS. 5-7 to configure BWP 806 and configure one or more subband BWPs (e.g., subband DL BWP 808 and subband UL BWP 810) in the BWP 806. The intermediate region (e.g., including the F symbols in symbol structures 502 and 504, and including UL symbols in slot structures 802 and 804) of the slot can be configured by the wireless communication node 102 or 202, or pre-agreed upon between the wireless communication node 102 or 202 and the wireless communication device 104 or 204. Note that the intermediate region here is just an example of some OFDM symbols in the middle of the slot. More generally, these symbols can be located anywhere within the slot. In these symbols, it is allowed to configure BWPs or subband BWPs with opposite transmission directions (e.g., with respect to the transmission direction(s) of one or more symbol(s)). Some or all of the frequency domain resources of these symbols can be configured to perform opposite transmission directions compared to the transmission direction(s) of the symbols. These symbols in the slot can be configured by the wireless communication node 102 or 202, or pre-agreed upon between the wireless communication node 102 or 202 and the wireless communication device 104 or 204.

The BWP 806 can have a frequency range smaller than or equal to the frequency range of symbols (e.g., OFDM symbols). Configuring the BWP 806 can include the wireless communication node 102 or 202 determining or specifying the frequency range (e.g., in terms of subcarriers) and a time duration (e.g., in terms of OFDM symbols or RBs) of the BWP 806. Configuring the subband BWP(s) can include the wireless communication node 102 or 202 configuring at least one symbol type for each subband BWP. For example, the wireless communication node 102 or 202 can configure DL OFDM symbols and UL OFDM symbols for the subband DL BWP 808, and can configure DL OFDM symbols for the subband UL BWP 810. Accordingly, the subband DL BWP 808 can extend along all or some of the DL symbols and some or all of the UL symbols of the BWP 806 in the time domain, and the subband UL BWP 810 can extend along all or some of the UL OFDM symbols of the BWP 806 in the time domain. The frequency range of the subband UL BWP 810 can extend across all or part of the frequency domain resources of the UL symbols. The frequency range of the subband DL BWP 808 can extend across can extend across all or part of the frequency domain resources of the DL and UL symbols.

In some implementations, and similar to the description above with regard to FIG. 5, configuring a subband BWP can include skipping one or more symbols. For example, the wireless communication node 102 or 202 can skip one or more DL symbols and/or one or more UL symbols in configuring the subband DL BWP 808. The wireless communication node 102 or 202 may skip one or more UL symbols in configuring the subband UL BWP 810. The subband DL BWP 808 and/or the subband UL BWP 810 can be continuous or discontinuous with gaps due to skipping of OFDM frames.

Configuring the BWP 806 and/or the subband BWPs 808 and 810 can include the wireless communication node 102 or 202 sending or signaling indications of the parameters (e.g., frequency ranges and/or time durations) of the BWP 806 and/or the subband BWPs 808 and 810 to the wireless communication device 104 or 204. As discussed above with regard to FIGS. 5-7, new signaling (e.g., RRC signaling, MAC CE signaling or DCI signaling) can be introduced to configure the BWP 806. The BWP 806 may be configured with no explicit DL or UL attributes. The wireless communication node 102 or 202 can determine or specify DL and UL symbol types for each of one or more subband DL BWPs 808 and/or can determine or specify UL symbol type for each of one or more subband UL BWPs 810. The wireless communication node 102 or 202 can configure the subband DL BWP(s) 808 and/or the subband UL BWPs 810 through signaling (e.g., RRC signaling, MAC CE signaling or DCI signaling) or pre-agreement between the wireless communication node 102 or 202 and the wireless communication device 104 or 204. For instance, the wireless communication node 102 or 202 can signal or send the parameters (e.g., type(s) of OFDM symbols, location(s) of OFDM symbols within the BWP 806, frequency range, etc.) defining each subband BWP in the BWP 806. If symbols are skipped when configuring any of the subband BWPs, the skipped symbols can be configured by the wireless communication node 102 or 202 (e.g., determined and signaled to the wireless communication device 104 or 204) or pre-agreed upon between the wireless communication device 104 or 204 and the wireless communication node 102 or 202. In general, signaling of the configuration parameters of the BWP 806 and/or parameters of any subband BWP in the BWP 806 can be performed as discussed above with regard to FIGS. 5-7. With regard to the subband DL BWP 808, resource elements or portions of UL symbols within the subband DL BWP 808 are configured for downlink transmission opposite to their initial property or type. In some implementations, the subband DL BWP 808 and the subband UL BWP 810 can be directly configured in the bandwidth corresponding to a cell or carrier.

Upon receiving the signaling, the wireless communication device 104 or 204 can determine the BWP 806 and/or any subband BWPs therein. The wireless communication device 104 or 204 can determine the property or type of each subband BWP (e.g., subband DL BWP or subband UL BWP). The wireless communication device 104 or 204 can transmit or receive data according to the configured subband DL BWP(s) 808 or subband UL BWP(s) 810. Since the subband DL BWP(s) 808 or subband UL BWP(s) 810 are configured within the BWP 806, the subband DL BWP(s) 808 and the subband UL BWP(s) 810 are treated by the wireless communication device 104 or 204 as having the same center frequency point (e.g., the center frequency of the BWP 806). As a result, the switching delay between the sub-band DL BWP(s) 08 and the sub-band UL BWP(s) 810 are minimized or even reduced to zero. Signaling and decoding of the configuration parameters can be performed as discussed above in relation to FIGS. 5-7.

In some implementations, the BWP 806 can include at least one subband DL BWP 808 and/or at least one subband UL BWP 810. The wireless communication device 104 or 204 can be configured with multiple BWPs 806, and the frequency domain resources of the multiple BWPs can overlap. Different BWPs 806 can contain the same or different type(s) or number(s) of symbols in the time domain. For example, the types of symbols contained in the first BWP and the second BWP may be different. Multiple subband DL BWPs 808 and/or multiple subband UL BWPs 810 can be configured within one BWP 806. Different subband DL BWPs 808 can contain the same or different symbols (e.g., with respect to the number(s), location(s) or type(s) of symbols) in the time domain. Different subband UL BWPs 810 can contain the same or different symbols (e.g., in terms of the number(s), location(s) or type(s) of symbols) in the time domain.

In subband BWP configurations having a subband BWP that is configured for downlink transmission direction (e.g., subband DL BWP 808) and includes at least one symbol with an uplink transmission direction, as described in relation with FIG. 8, the wireless communication device 104 or 204 can transmit or receive data over the subband BWP according to one or more rules. For instance, the wireless communication device 104 or 204 can transmit or receive data over the subband DL BWP 808 according to any combination of the rules (e.g., Rule 16 to Rule 20) below.

Rule 16: In the case where a subband BWP is configured to include at least one symbol with an uplink transmission direction and the subband BWP is configured for downlink transmission direction (e.g., subband UL BWP 808), the wireless communication node 102 or 202 can configure the subband BWP to not overlap in the frequency domain with an uplink signal or channel that is common to one or more wireless communication devices. For example, the subband DL BWP 808 can be configured not to overlap with PRACH and/or cell common PUCCH in frequency domain. The UE 104 or 204 may not be allowed to transmit PRACH and/or cell common PUCCH in the UL symbols from the frequency domain resources corresponding to the subband DL BWP. However, the UE 104 or 204 may be allowed to transmit PRACH and/or cell common PUCCH in the UL symbols from a frequency domain resources other than the frequency domain resources corresponding to the subband DL BWP. The UE 104 or 204 may be allowed to receive DL data in all symbols (including UL symbols) contained in the subband DL BWP. However, if the subband DL BWP 808 is configured to contain UL symbols, the base station 102 or 202 can receive PRACH and/or cell common PUCCH in UL symbols from a frequency domain resources other than the frequency domain resources corresponding to the subband DL BWP 808. When the UE 104 or 204 transmits the PRACH and/or cell common PUCCH in some UL symbols from the subband DL BWP, the UE 104 or 204 would not expect to (be scheduled to) receive DL data from the subband DL BWP in the UL symbol where the PRACH and/or cell common PUCCH is located.

Rule 17: In the case where a subband BWP is configured to include at least one symbol with an uplink transmission direction and the subband BWP is configured for downlink transmission direction (e.g., subband UL BWP 808), the wireless communication node 102 or 202 can configure the subband BWP to overlap in the frequency domain with an uplink signal or channel that is common to one or more wireless communication devices. The uplink signal or channel may not be transmitted by the wireless communication device 104 or 204 in the symbol with the uplink transmission direction. Subband DL BWP 808 can be configured to overlap PRACH and/or cell common PUCCH in frequency domain (including partial overlap). But new UEs may not transmit the PRACH and/or cell common PUCCH in the UL symbols of the subband DL BWP 808. This approach helps simplify UE capabilities. However, the base station 102 or 202 can receive PRACH and/or cell common PUCCH in the UL symbol from the subband DL BWP for legacy UEs if the PRACH and/or cell common PUCCH are configured in the UL symbol and in a frequency domain resource corresponding to the subband DL BWP 808.

Rule 18: In the case where a subband BWP is configured to include at least one symbol with an uplink transmission direction and the subband BWP is configured for downlink transmission direction (e.g., subband UL BWP 808), the wireless communication node 102 or 202 can configure the subband BWP to overlap in the frequency domain with an uplink signal or channel that is common to one or more wireless communication devices. The uplink signal or channel may be transmitted by the wireless communication device 104 or 204 in the symbol with the uplink transmission direction, within which the wireless communication device 104 or 204 is not scheduled to receive downlink data. Subband DL BWP can be configured to overlap with PRACH and/or cell common PUCCH in frequency domain (including partial overlap). New UEs with higher capability can transmit PRACH and/or cell common PUCCH in UL symbols from this subband DL BWP. In this case, when the new UEs transmit PRACH and/or cell common PUCCH in the UL symbol from the subband DL BWP, the new UEs would not expect to receive DL data in the UL symbol.

Rule 19: In the case where a subband BWP is configured to include at least one symbol with an uplink transmission direction and the subband BWP is configured for downlink transmission direction (e.g., subband UL BWP 808), the wireless communication node 102 or 202 can configure the subband BWP to overlap in the frequency domain with an uplink signal or channel that is common to one or more wireless communication devices. The subband BWP can exclude symbols in the time domain where the uplink signal or channel is located. For example, subband DL BWP 808 can be configured to overlap PRACH and/or cell common PUCCH in frequency domain (including partial overlap). However, in the time domain, the subband DL BWP 808 may not contain the UL symbols where the PRACH and/or cell common PUCCH are located. That is, the subband DL BWP 808 may not actually contain symbols of PRACH and/or cell common PUCCH in the time domain. In other words, the subband DL BWP 808 can skip the UL symbols where the PRACH and/or cell common PUCCH are located by default, and other UL symbols are included.

Rule 20: In the case where a subband BWP is configured to include at least one symbol with an uplink transmission direction and the subband BWP is configured for downlink transmission direction (e.g., subband UL BWP 808), the wireless communication node 102 or 202 can configure the subband BWP to overlap in the frequency domain with an uplink signal or channel that is common to one or more wireless communication devices. If the wireless communication device 104 or 204 is scheduled to perform downlink reception on a resource that overlaps in the time domain with that of the uplink signal or channel, the wireless communication device 104 or 204 can skip the downlink reception on the resource that overlaps in the time domain with that of the uplink signal or channel. Subband DL BWP 808 can be configured to overlap with PRACH and/or cell common PUCCH in the frequency domain (including partial overlap), and in the time domain, if the UE 104 or 204 is scheduled to perform downlink reception with resources that overlap with resources corresponding to PRACH and/or cell common, then the UE 104 or 204 would not expect to perform the downlink reception (the UE can cancel the downlink reception, or cancel the downlink reception at least on the overlapping time domain resources). The UE 104 or 204 may be allowed to transmit PRACH and/or cell common PUCCH from this subband DL BWP. The downlink reception can be supported in the sub-band DL BWP in UL symbols other than the UL symbols where PRACH and/or cell common PUCCH are located.

In the above rules Rule 16 to Rule 20, PRACH and/or cell common PUCCH are just examples of a cell common uplink signal/channel. Common uplink signals/channels can include but are not limited to: PRACH, cell common PUCCH, initial BWP and reference signals (e.g., DMRS, SRS, etc.).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

configuring, by a wireless communication node capable of supporting full duplex communication based on a subband, a first bandwidth part in frequency domain;

configuring, by the wireless communication node, at least a first subband in at least one specific type of orthogonal frequency division multiplexing (OFDM) symbols in time domain, wherein, in response to the first subband being configured for an uplink transmission direction, the at least one specific type of OFDM symbols include at least one symbol for a transmission direction that is opposite to that of the first subband; and communicating between the wireless communication node and a wireless communication device based on at least one of the first subband or the first bandwidth part.

2. The method of claim 1, wherein, in response to the first subband being configured for a downlink transmission direction, the at least one specific type of OFDM symbols include at least one of:

a symbol with a flexible transmission direction; or a symbol for a transmission direction that is same as that of the first subband.

3. The method of claim 1, wherein the configuration of the first subband includes a configuration of the OFDM symbols for the first subband in time domain.

4. The method of claim 3, wherein the first bandwidth part:

is configured to include at least one of: a symbol with a flexible transmission direction, a symbol with a downlink transmission direction, or a symbol with an uplink transmission direction; and occupies a same frequency band for each of the at least one of: the symbol with the flexible transmission direction, the symbol with the downlink transmission direction, or the symbol with the uplink transmission direction.

5. The method of claim 4, wherein the first bandwidth part has a same center frequency for each of the at least one of: the symbol with the flexible transmission direction, the symbol with the downlink transmission direction, or the symbol with the uplink transmission direction.

6. The method of claim 3, comprising:

configuring, by the wireless communication node, the first subband and a second subband within the first bandwidth part in frequency domain.

7. The method of claim 6, comprising:

configuring, by the wireless communication node, the first subband and the second subband within the first bandwidth part in at least one of: a symbol with a flexible transmission direction, a symbol with a downlink transmission direction, or a symbol with an uplink transmission direction.

8. The method of claim 1, comprising:

configuring, by the wireless communication node, the first subband for a first transmission direction, and a second subband for a second transmission direction, within the first bandwidth part.

9. The method of claim 1, wherein when the at least one specific type of OFDM symbols include a symbol with a flexible transmission direction, and the first subband is for uplink transmission direction, and wherein:

configuring, by the wireless communication node, the first subband to not overlap in the frequency domain with a downlink signal or channel that is common to one or more wireless communication devices; or configuring, by the wireless communication node, the first subband to overlap in the frequency domain with a downlink signal or channel that is common to one or more wireless communication devices, wherein the downlink signal or channel is not to be received by the wireless communication node in the symbol with the flexible transmission direction; or configuring, by the wireless communication node, the first subband to overlap in the frequency domain with a downlink signal or channel that is common to one or more wireless communication devices, wherein the downlink signal or channel is received by the wireless communication node in the symbol with the flexible transmission direction, within which the wireless communication node is not scheduled to transmit uplink data or configuring, by the wireless communication node, the first subband to overlap in the frequency domain with a downlink signal or channel that is common to one or more wireless communication devices, wherein the first subband excludes OFDM symbols in the time domain where the downlink signal or channel is located; or configuring, by the wireless communication node, the first subband to overlap in the frequency domain with a downlink signal or channel that is common to one or more wireless communication devices, wherein if the wireless communication node is scheduled to perform uplink transmission on a resource that overlaps in the time domain with that of the downlink signal or channel, the wireless communication node skips the uplink transmission on the resource that overlaps in the time domain with that of the downlink signal or channel.

10. The method of claim 1, wherein when the at least one specific type of OFDM symbols include a symbol with a flexible transmission direction, and the first subband is for downlink transmission direction, and wherein:

configuring, by the wireless communication node, the first subband to not overlap in the frequency domain with an uplink signal or channel that is common to one or more wireless communication devices; or configuring, by the wireless communication node, the first subband to overlap in the frequency domain with an uplink signal or channel that is common to one or more wireless communication devices, wherein the uplink signal or channel is not to be transmitted by the wireless communication node in the symbol with the flexible transmission direction; or configuring, by the wireless communication node, the first subband to overlap in the frequency domain with an uplink signal or channel that is common to one or more wireless communication devices, wherein the uplink signal or channel is transmitted by the wireless communication node in the symbol with the flexible transmission direction, within which the wireless communication node is not scheduled to receive downlink data; or configuring, by the wireless communication node, the first subband to overlap in the frequency domain with an uplink signal or channel that is common to one or more wireless communication devices, wherein the first subband excludes OFDM symbols in the time domain where the uplink signal or channel is located; or configuring, by the wireless communication node, the first subband to overlap in the frequency domain with an uplink signal or channel that is common to one or more wireless communication devices, wherein if the wireless communication node is scheduled to perform downlink reception on a resource that overlaps in the time domain with that of the uplink signal or channel, the wireless communication node skips the downlink reception on the resource that overlaps in the time domain with that of the uplink signal or channel.

11. The method of claim 1, wherein when the at least one specific type of OFDM symbols include a symbol with a downlink transmission direction, and the first subband is for uplink transmission direction, and wherein:

configuring, by the wireless communication node, the first subband to not overlap in the frequency domain with a downlink signal or channel that is common to one or more wireless communication devices; or configuring, by the wireless communication nodes, the first subband to overlap in the frequency domain with a downlink signal or channel that is common to one or more wireless communication devices, wherein the downlink signal or channel is not to be received by the wireless communication node in the symbol with the downlink transmission direction; or configuring, by the wireless communication node, the first subband to overlap in the frequency domain with a downlink signal or channel that is common to one or more wireless communication devices, wherein the downlink signal or channel is received by the wireless communication node in the symbol with the downlink transmission direction, within which the wireless communication node is not scheduled to transmit uplink data; or configuring, by the wireless communication node, the first subband to overlap in the frequency domain with a downlink signal or channel that is common to one or more wireless communication devices, wherein the first subband excludes OFDM symbols in the time domain where the downlink signal or channel is located; or configuring, by the wireless communication node, the first subband to overlap in the frequency domain with a downlink signal or channel that is common to one or more wireless communication devices, wherein if the wireless communication node is scheduled to perform uplink transmission on a resource that overlaps in the time domain with that of the downlink signal or channel, the wireless communication node skips the uplink transmission on the resource that overlaps in the time domain with that of the downlink signal or channel.

12. The method of claim 1, wherein when the at least one specific type of OFDM symbols include a symbol with an uplink transmission direction, and the first subband is for downlink transmission direction, and wherein:

configuring, by the wireless communication node, the first subband to not overlap in the frequency domain with an uplink signal or channel that is common to one or more wireless communication devices; or configuring, by the wireless communication node, the first subband to overlap in the frequency domain with an uplink signal or channel that is common to one or more wireless communication devices, wherein the uplink signal or channel is not to be transmitted by the wireless communication node in the symbol with the uplink transmission direction; or configuring, by the wireless communication node, the first subband to overlap in the frequency domain with an uplink signal or channel that is common to one or more wireless communication devices, wherein the uplink signal or channel is transmitted by the wireless communication node in the symbol with the uplink transmission direction, within which the wireless communication node is not scheduled to receive downlink data; or configuring, by the wireless communication node, the first subband to overlap in the frequency domain with an uplink signal or channel that is common to one or more wireless communication devices, wherein the first subband excludes OFDM symbols in the time domain where the uplink signal or channel is located; or configuring, by the wireless communication node, the first subband to overlap in the frequency domain with an uplink signal or channel that is common to one or more wireless communication devices, wherein if the wireless communication node is scheduled to perform downlink reception on a resource that overlaps in the time domain with that of the uplink signal or channel, the wireless communication node skips the downlink reception on the resource that overlaps in the time domain with that of the uplink signal or channel.

13. A method, comprising:

receiving, by a wireless communication device from a wireless communication node capable of supporting full duplex communication, a configuration of at least one of: a first bandwidth part and a first subband, wherein the first bandwidth part is configured in frequency domain, wherein at least the first subband is configured in at least one specific type of orthogonal frequency division multiplexing (OFDM) symbols in time domain, wherein, in response to the first subband being configured for an uplink transmission direction, the at least one specific type of OFDM symbols include at least one symbol for a transmission direction that is opposite to that of the first subband; and communicating between the wireless communication device and the wireless communication node based on at least one of the first subband or the first bandwidth part.

14. A wireless communication device, comprising:

at least one processor configured to:

receive, via a receiver from a wireless communication node capable of supporting full duplex communication, a configuration of at least one of: a first bandwidth part and a first subband, wherein the first bandwidth part is configured in frequency domain, wherein at least the first subband is configured in at least one specific type of orthogonal frequency division multiplexing (OFDM) symbols in time domain, wherein, in response to the first subband being configured for an uplink transmission direction, the at least one specific type of OFDM symbols include at least one symbol for a transmission direction that is opposite to that of the first subband; and communicating between the receiver and the wireless communication node based on the first subband.

15. A wireless communication node capable of supporting full duplex communication, comprising:

at least one processor configured to:

configure a first bandwidth part in frequency domain;

configure at least a first subband within the first bandwidth part in at least one specific type of orthogonal frequency division multiplexing (OFDM) symbols in time domain, wherein, in response to the first subband being configured for an uplink transmission direction, the at least one specific type of OFDM symbols include at least one symbol for a transmission direction that is opposite to that of the first subband; and communicating between the wireless communication node and a wireless communication device based on at least one of the first subband or the first bandwidth part.

16. The wireless communication node of claim 15, wherein, in response to the first subband being configured for a downlink transmission direction, the at least one specific type of OFDM symbols include at least one of:

a symbol with a flexible transmission direction; or a symbol for a transmission direction that is same as that of the first subband.

17. The wireless communication node of claim 15, wherein the configuration of the first subband includes a configuration of the OFDM symbols for the first subband in time domain.

18. The wireless communication node of claim 17, wherein the first the bandwidth part:

is configured to include at least one of: a symbol with a flexible transmission direction, a symbol with a downlink transmission direction, or a symbol with an uplink transmission direction; and occupies a same frequency band for each of the at least one of: the symbol with the flexible transmission direction, the symbol with the downlink transmission direction, or the symbol with the uplink transmission direction.

19. The wireless communication node of claim 18, wherein the first bandwidth part has a same center frequency for each of the at least one of: the symbol with the flexible transmission direction, the symbol with the downlink transmission direction, or the symbol with the uplink transmission direction.

20. The wireless communication node of claim 17, wherein the at least one processor is configured to configure the first subband and a second subband within the first bandwidth part in the frequency domain.

\* \* \* \* \*